United States Patent
Giron et al.

(10) Patent No.: US 12,011,075 B2
(45) Date of Patent: Jun. 18, 2024

(54) PROCESS FOR MANUFACTURING A FALSE NAIL

(71) Applicant: L'OREAL, Paris (FR)

(72) Inventors: Franck Giron, Lagny sur Marne (FR); Henri Samain, Bievres (FR); Pierre Ducastin, Vilennes sur Seine (FR)

(73) Assignee: L'OREAL, Paris (FR)

( * ) Notice: Subject to any disclaimer, the term of this patent is extended or adjusted under 35 U.S.C. 154(b) by 23 days.

(21) Appl. No.: 16/091,893

(22) PCT Filed: Apr. 6, 2017

(86) PCT No.: PCT/EP2017/058202
§ 371 (c)(1),
(2) Date: Oct. 5, 2018

(87) PCT Pub. No.: WO2017/174703
PCT Pub. Date: Oct. 12, 2017

(65) Prior Publication Data
US 2019/0104823 A1   Apr. 11, 2019

(30) Foreign Application Priority Data

Apr. 8, 2016 (FR) .................................. 16 53126
Apr. 8, 2016 (FR) .................................. 16 53127
(Continued)

(51) Int. Cl.
*A45D 31/00*   (2006.01)
*B29C 33/38*   (2006.01)
(Continued)

(52) U.S. Cl.
CPC .......... *A45D 31/00* (2013.01); *B29C 33/3842* (2013.01); *B29C 35/0805* (2013.01);
(Continued)

(58) Field of Classification Search
CPC ... B29C 64/10; B29C 64/106; B29C 67/0066; B29C 67/0088; B29C 64/171;
(Continued)

(56) References Cited

U.S. PATENT DOCUMENTS 2,941,535 A   6/1960 Lappe
3,502,760 A * 3/1970 Ono .................. B29C 45/14065
264/247

(Continued)

FOREIGN PATENT DOCUMENTS

EP   0 577 515 A1   1/1994
EP   0 845 257 A1   6/1998
(Continued)

OTHER PUBLICATIONS

Machine translation of JP 2012070913, retrieved Feb. 7, 2024 (Year: 2024).*

(Continued)

*Primary Examiner* — Timothy Kennedy
(74) *Attorney, Agent, or Firm* — Oblon, McClelland, Maier & Neustadt, L.L.P.

(57) ABSTRACT

The present invention relates to a process for manufacturing a false nail, comprising the following steps: a) producing by additive manufacture, from 3D digital data originating from the acquisition of a relief, especially that of the finger intended to receive the false nail, a mold using a first material, b) depositing onto the mold a layer formed from at least one adhesive composition, c) depositing onto the mold at least one layer of a coating of a second material, different from the first, so as to form the false nail.

21 Claims, 5 Drawing Sheets

(30) Foreign Application Priority Data

Figure 7:
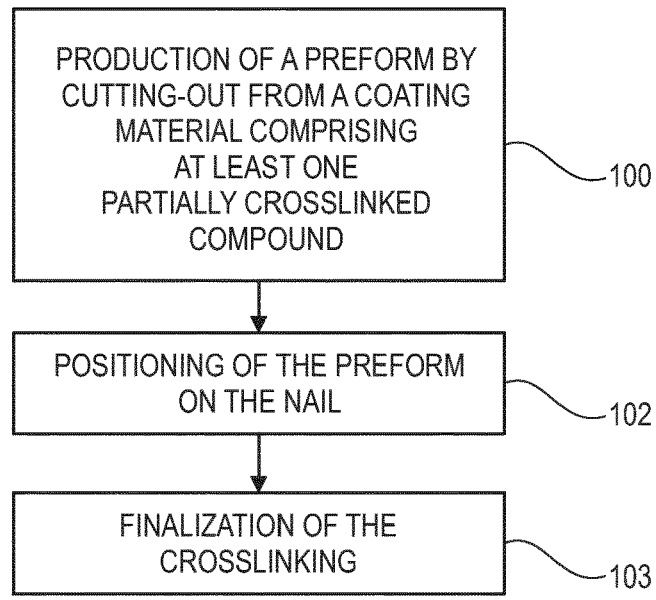

Apr. 8, 2016 (FR) .................................. 16 53128
Apr. 8, 2016 (FR) .................................. 16 53131

(51) Int. Cl.

| | |
|---|---|
| *B29C 35/08* | (2006.01) |
| *B29C 41/22* | (2006.01) |
| *B29C 41/42* | (2006.01) |
| *B29C 64/386* | (2017.01) |
| *B33Y 10/00* | (2015.01) |
| *B33Y 50/00* | (2015.01) |
| *B33Y 70/00* | (2020.01) |
| *B33Y 80/00* | (2015.01) |
| *B29C 64/112* | (2017.01) |
| *B29K 91/00* | (2006.01) |
| *B29K 105/00* | (2006.01) |
| *B29L 9/00* | (2006.01) |
| *B29L 31/00* | (2006.01) |

(52) U.S. Cl.
CPC .............. *B29C 41/22* (2013.01); *B29C 41/42* (2013.01); *B29C 64/386* (2017.08); *B33Y 10/00* (2014.12); *B33Y 50/00* (2014.12); *B33Y 70/00* (2014.12); *B33Y 80/00* (2014.12); *B29C 2035/0827* (2013.01); *B29C 64/112* (2017.08); *B29K 2091/00* (2013.01); *B29K 2105/0097* (2013.01); *B29K 2891/00* (2013.01); *B29L 2009/00* (2013.01); *B29L 2031/718* (2013.01)

(58) Field of Classification Search
CPC ..... B29C 64/176; B29C 64/182; B29C 64/40; A45D 29/00; A45D 31/00; A45D 29/004; A45D 2031/005; A45D 29/001; B32B 2037/1215; B32B 2037/1253; B32B 37/1284
See application file for complete search history.

(56) References Cited

U.S. PATENT DOCUMENTS

| | | | | |
|---|---|---|---|---|
| 4,361,160 | A | * | 11/1982 | Bryce ................ A45D 31/00 132/73 |
| 4,554,935 | A | | 11/1985 | Hokama |
| 4,718,957 | A | * | 1/1988 | Sensenbrenner ...... A45D 31/00 156/289 |
| 4,954,190 | A | | 9/1990 | Taeckens |
| 5,156,911 | A | | 10/1992 | Stewart |
| 5,263,130 | A | * | 11/1993 | Pomerantz ............ B33Y 50/00 700/145 |
| 5,770,184 | A | | 6/1998 | Keller |
| 5,931,166 | A | * | 8/1999 | Weber ................ A45D 31/00 132/73 |
| 6,060,073 | A | | 5/2000 | Keller |
| 6,065,969 | A | * | 5/2000 | Rifkin ................ A45D 29/001 700/161 |
| 6,190,593 | B1 | * | 2/2001 | Baba ................... A45D 31/00 264/222 |
| 7,123,983 | B2 | | 10/2006 | Yogo et al. |
| 7,185,660 | B1 | | 3/2007 | Han |
| 7,526,416 | B2 | | 4/2009 | Nielson et al. |
| 2001/0032654 | A1 | * | 10/2001 | Coker ................. A45D 31/00 132/73 |
| 2003/0102597 | A1 | * | 6/2003 | Elenbaas ............. A45D 31/00 264/259 |
| 2006/0088483 | A1 | * | 4/2006 | Thevenet .............. A61Q 3/02 424/61 |
| 2007/0057403 | A1 | * | 3/2007 | Nielson ............... A45D 31/00 264/222 |
| 2009/0092310 | A1 | * | 4/2009 | Gifford ................. A61K 8/00 382/141 |
| 2011/0005542 | A1 | | 1/2011 | Franz et al. |
| 2011/0132386 | A1 | | 6/2011 | Huynh |
| 2012/0141773 | A1 | * | 6/2012 | Kergosien ........... A45D 29/001 132/73 |
| 2013/0174862 | A1 | * | 7/2013 | Samain ................ B29C 64/386 132/73 |
| 2013/0327350 | A1 | | 12/2013 | Huynh |
| 2014/0183769 | A1 | * | 7/2014 | Li ....................... B29C 51/46 264/40.1 |
| 2015/0190955 | A1 | * | 7/2015 | Yen ..................... B32B 27/30 428/161 |
| 2015/0251351 | A1 | * | 9/2015 | Feygin ................. B29C 64/141 156/267 |
| 2017/0027300 | A1 | | 2/2017 | Samain et al. |
| 2018/0370081 | A1 | * | 12/2018 | McCarthy ........... B29C 33/40 |
| 2021/0001538 | A1 | * | 1/2021 | Fujikawa ............. B29C 59/02 |

FOREIGN PATENT DOCUMENTS

| | | |
|---|---|---|
| EP | 0 848 941 A1 | 6/1998 |
| EP | 0 951 897 A2 | 10/1999 |
| EP | 2 774 506 A2 | 9/2014 |
| FR | 2 846 861 A1 | 5/2004 |
| FR | 2 964 305 A1 | 3/2012 |
| FR | 2 970 649 A1 | 7/2012 |
| JP | 2000-301778 A | 10/2000 |
| JP | 2006-305152 A | 11/2006 |
| JP | 2012070913 A * | 4/2012 |
| JP | 2012-196292 A | 10/2012 |
| WO | WO 01/19333 A1 | 3/2001 |
| WO | WO 2005/076992 A2 | 8/2005 |
| WO | WO 2009/079463 A1 | 6/2009 |
| WO | WO 2015/010696 A2 | 1/2015 |
| WO | WO 2015/132734 A1 | 9/2015 |

OTHER PUBLICATIONS

International Search Report dated Nov. 11, 2017 in PCT/EP2017/058202 filed Apr. 6, 2017.

* cited by examiner

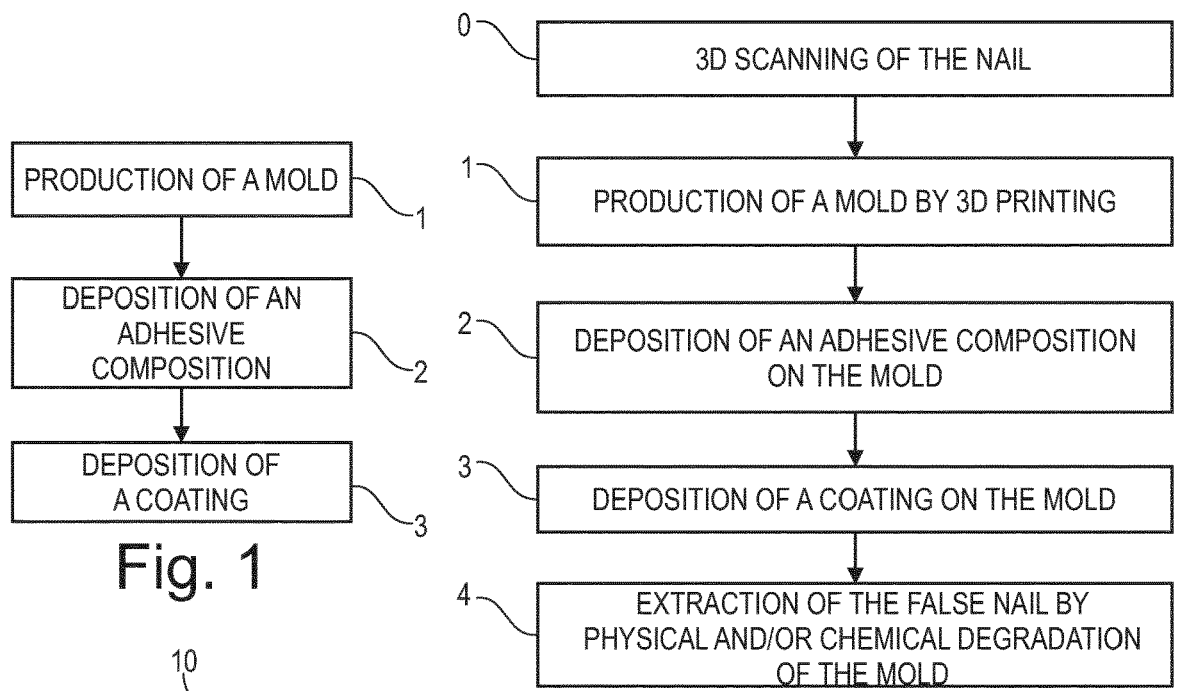
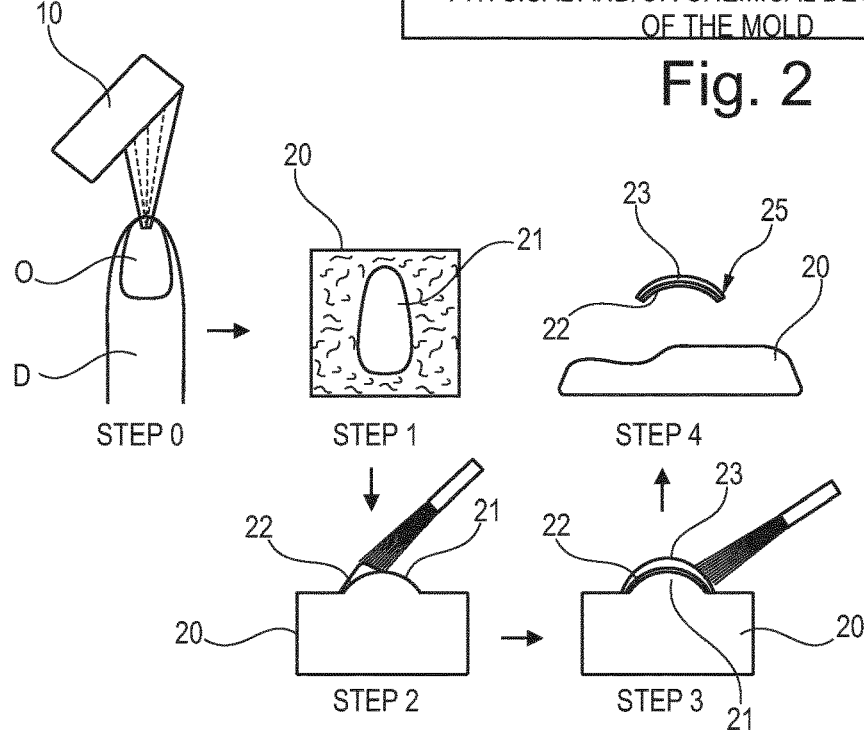
Fig. 3
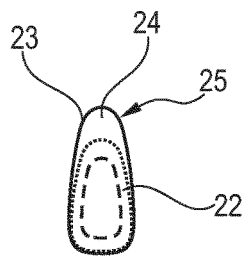
Fig. 4
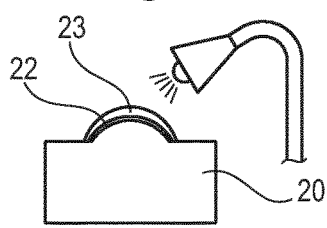
Fig. 5
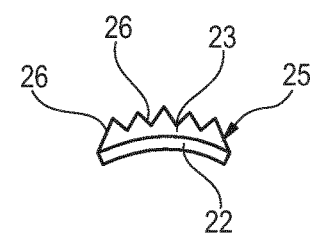
Fig. 6

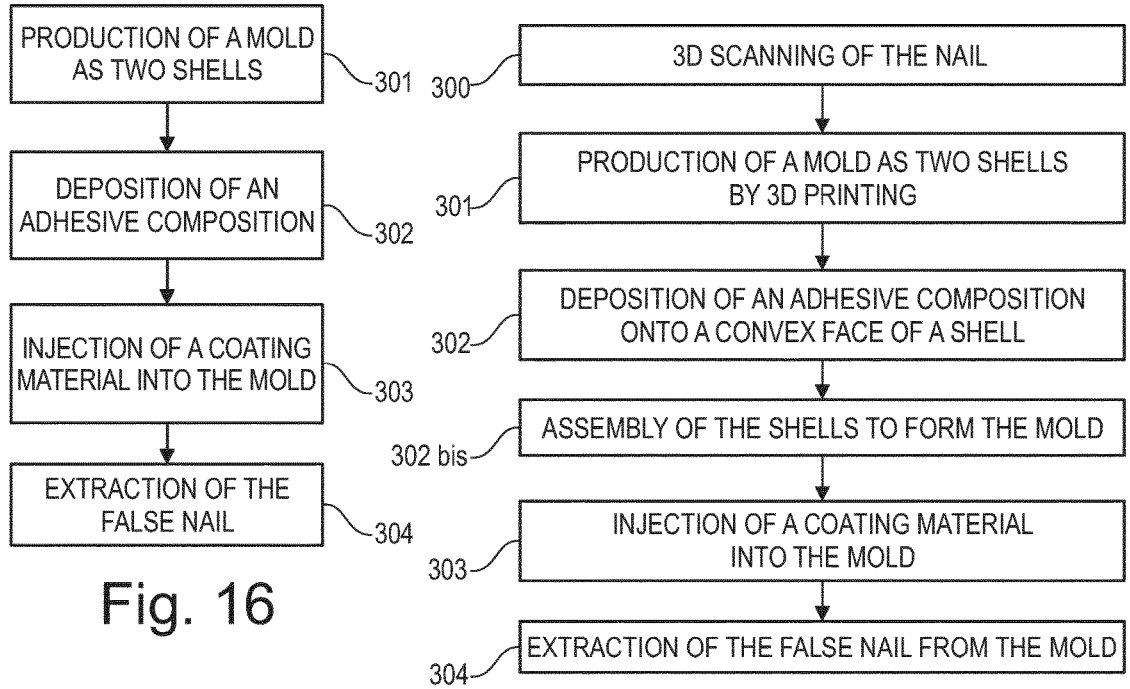
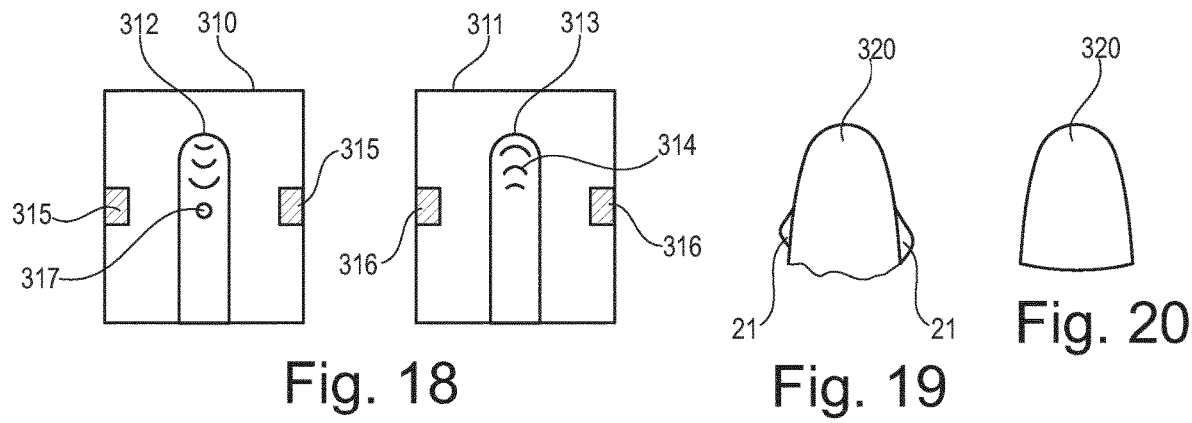
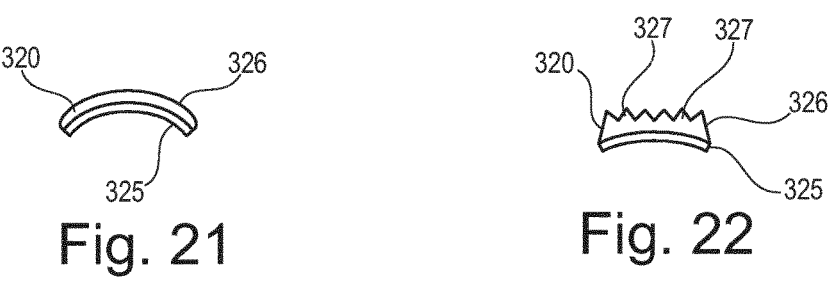

PROCESS FOR MANUFACTURING A FALSE NAIL

The present invention relates to the production of false nails, also known as artificial nails.

PRIOR ART AND TECHNICAL PROBLEM

The making up of natural nails on the hands or feet is directed toward giving them a better colored appearance and/or toward enlarging, lengthening or unifying them, modifying their surface appearance, making them glossy or producing decorative or expressive patterns thereon. Nail makeup also allows the nails to be strengthened to protect them against impacts, friction or liquids.

The techniques available at the present time for achieving these objectives are, depending on the case, more or less satisfactory.

Varnishes are effective for giving a colored and/or glossy appearance. However, they do not make it possible to lengthen the nails or to unify their length and they are, furthermore, relatively fragile. To a certain extent, varnishes allow patterns to be formed. However, these patterns must be made by a skilled person and the lifetime of the varnish limits the interest thereof, with regard to the required investment.

Moreover, patches formed from flexible adhesive strips are known, which conform to the curvature of the nail when they are applied thereto. The major drawback of patches is that they can only be presented to users in given forms that do not correspond to the exact contour of the nail. Thus, patches require cutting-out work, which it is not possible to do once the patch has been stuck on. Now, it has been noted that many people have difficulty in performing this cutting-out. Moreover, although patches offer a glossy and colored finish, which is often superior to that of varnishes and with good persistence, since they follow the surface of the nails, the surface imperfections of the nail are nevertheless perceptible. Moreover, patches cannot lengthen the nails, since, if the patch exceeds in length, it very quickly bends under the effect of impacts. In theory, patches can be used for making patterns. However, this technique is limited since the cutting-out work can damage the pattern, which then becomes worthless.

The conventional technique for applying false nails, which consists in applying a plastic base to a part of the nail and then in pouring a resin thereon, is advantageous since it makes it possible to lengthen and unify the surface of the nails. However, this technique requires considerable skill and takes a long time, conventionally more than 30 minutes. The maintenance following the application takes up an appreciable amount of time, since, when the nail grows, it is necessary to rework the resin and to pour a new coat. Another drawback of this technique lies in the fact that the false nail thus obtained cannot be removed at any time. This limits its development, since many women desire decoration and/or lengthening for a limited period. Knowing that they cannot take off their false nails easily, they are unwilling to give them a try, and when they do dare to, they prefer limited lengthening and decorations.

Another major drawback is that the natural nail suffers from not being in the open air and, if it remains covered with resin for a long time, it may soften or develop infections.

Moreover, certain false nails require the presence on the nail of an adhesive to make the false nail adhere to the underlying nail. The adhesive must be placed uniformly on each nail to which a false nail is to be applied, without any holes or overthicknesses, in order for the contact between the nail and the false nail to be free of points of infiltration. The adhesive must moreover be placed on only one face without running or overflowing around the nail, which excludes adhesive application techniques by dipping or spraying an adhesive onto the nail, all the more so since certain adhesives cannot be applied by spraying.

Finally, it is preferable for the false nail to match the exact shape of the nail. Certain methods have thus been described for producing false nails or patches that are personalized to the size of the nails. These methods include the taking of measurements and the production of parts corresponding precisely to the shape of the nail.

Patent EP 0 577 515 thus describes a 3D acquisition and the cutting-out of a false nail.

U.S. Pat. No. 7,123,983 describes a system which measures without contact the 3D shape of the nail and then commands a tool to make false nails. It is possible to adjust the length and style of the false nail.

U.S. Pat. No. 7,526,416 describes a process in which a comparison is made between a 3D file and pre-existing false nails.

WO 2009/079463 mentions the use of stereolithography for creating false nails.

WO 2005/076992 describes the manufacture of a false nail from an acquisition of the surface relief of the nail.

Patent application JP 20000301778 describes a system for printing on false nails.

US 2013/0174862 describes a process for manufacturing false nails, in which a mold is made from a 3D data acquisition of the nail, and a coat is then deposited on this mold. This coat may be a sheet that is thermoformed on contact with the mold.

WO 2015/132734 and WO 2015/101696 describe 3D printing systems for printing an artificial nail onto a nail.

Moreover, the use of compositions that are crosslinkable by ultraviolet (UV) radiation is widespread for nail makeup.

EP 2 774 506 discloses a self-adhesive for nails comprising a layer of UV-crosslinkable composition. JP 2012196292 describes a process for manufacturing false nails using a UV-crosslinkable composition.

FR 2 846 861 discloses a false nail comprising fibrous armoring preimpregnated with a UV-crosslinking composition.

U.S. Pat. Nos. 2,941,535 and 4,554,935 describe false nails with orifices for receiving an adhesive.

U.S. Pat. No. 4,954,190 describes a process for applying a false nail, comprising the application of a porous material to the nail, an adhesive and an outer coating.

OBJECTIVE OF THE INVENTION

There is a need to further improve the manufacture of false nails.

In particular, there is a need for false nails which are ready to apply and which match the shape of the nails, saving the user from depositing herself a layer of glue or adhesive onto the nails.

Moreover, it is desirable to facilitate the manufacture of a tailor-made false nail, without requiring the presence or the dexterity of a professional.

I—Process for Manufacturing a False Nail

One subject of the invention is thus a process for manufacturing a false nail, comprising the following steps:

a) producing by additive manufacture, from 3D digital data originating from the acquisition of a relief, especially that of the finger intended to receive the false nail, a mold using a first material, b) depositing onto the mold a layer formed from at least one adhesive composition, c) depositing onto the mold at least one layer of a coating of a second material, different from the first, so as to form the false nail.

The manufacture of the false nail thus comprises the at least partial production of the adhesive, which makes it possible to obtain, if so desired, a layer uniformly distributed at the desired places, without overrunning. The false nail thus manufactured comprises at least part of the adhesive constituted by said layer formed from at least the adhesive composition, and at least one coating layer made of a second material, advantageously providing all or part of the visual appearance of the false nail.

Furthermore, the technique of additive manufacture from 3D digital data to make the mold makes it possible to manufacture a tailor-made false nail.

The process may be performed to make a false nail or, simultaneously, several false nails, for example for all the fingers of a person's hand or for both the hands. In this latter case, one or more molds for several false nails are made, and the adhesive composition and the coating are deposited onto each of the molds thus made.

Acquisition of the Relief

Acquisition of the relief may comprise the scanning, for example using acquisition means such as a 3D scanner, of the end of a user's finger, followed by isolation of a nail part of said scan resulting in the creation of 3D digital data, and the creation of a 3D object forming the mold from the 3D digital data. The 3D object may be designed so as to form a mold for manufacturing a false nail covering the nail and optionally lengthening it, for example by 5 mm in length. To do this, calculations from the 3D digital data may be made.

Thus, after step a), a mold that perfectly matches the relief of the nail concerned may be obtained.

The term "3D scanner" means a machine for scanning and acquiring images in three dimensions. The 3D scanner is thus a machine which analyzes the end of the user's finger including the nail, to collect precise information regarding the relief, the shape and optionally the appearance thereof. The digital data thus collected may then be used to construct the digital 3D object allowing the machine used to be run for the additive manufacture of the mold.

The 3D scanner may use any type of scanning technology and may be, for example, of the contact or non-contact type, preferably non-contact. Among the 3D scanners that may be used, mention may be made of the non-contact active scanner, the phase-shift scanner, the fringe-projection structured-light scanner, the multi-angle photography scanner, the manual or automatic laser triangulation scanner, the conoscopic holography laser scanner, the stereoscopic scanner, the silhouette scanner, or the like.

Production of the Mold

Additive manufacture for making the mold from a first material is advantageously 3D printing or stereolithography.

The mold may be made in a monoblock manner, comprising a single shell. In this case, the false nail is formed on the mold, by depositing the layer of adhesive composition and the coating layer thereon.

As a variant, the mold may be made so as to comprise two shells. The layer of adhesive composition may be deposited onto one of the open mold shells, and the coating is then deposited by injection of material after closing the mold.

Extraction of the False Nail from the Mold

The process may comprise a step of extracting the false nail from the mold by physical and/or chemical degradation of at least part of the mold. As a variant, the extraction of the false nail may be performed by opening the mold if it comprises two shells, and/or by simple removal of the false nail from the mold, for example using a tool that produces a contact force such as a gel or suction.

In the case of physical and/or chemical degradation, this may be at least partly performed by heating at least part of the first material. The physical and/or chemical degradation may be, additionally or alternatively, at least partly a mechanical degradation consisting in hollowing out, for example using a high-pressure water cleaner.

The physical and/or chemical degradation may also at least partly be a chemical degradation, consisting, for example, of selective dissolution of the first material using a solvent that is inert toward the adhesive composition and the second material. In this case, the solvent is advantageously chosen from alkanes, such as isoalkanes comprising at least six carbon atoms and gaseous $C_1$-$C_5$ alkanes, ketones, such as acetone or methyl ethyl ketone, ethers, such as dimethyl ether or diethyl ether, and esters, such as alkyl acetates.

As a variant, the chemical degradation may consist of chemical transformation with an acid or an alkaline agent.

As nonlimiting illustrations of acids and alkaline agents that are suitable for use in the invention, mention may be made especially of salicylic acid, glycolic acid, citric acid, lactic acid, sodium hydroxide, potassium hydroxide, ammonia, monoethanolamine, triethanolamine, calcium hydroxide, alkaline salts of amino acids, such as glycinate salts, urea and urea derivatives, guanidine derivatives, in particular guanidine carbonate or guanidine hydroxide, made, for example, by addition of guanidine carbonate and calcium hydroxide.

Degradation by heating is preferred.

Degradation other than purely mechanical degradation of the mold is advantageous insofar as it may make it possible to limit the damage of the layer of deposited adhesive composition, during the removal from the mold.

Cutting-Out of the False Nail

The process may comprise a step of cutting-out of the false nail.

In this case, the step of cutting-out of the false nail is performed, for example, manually or automatically, especially using a punch, a laser or water jet, a plasma or any other cutting-out technique.

This step may make it possible to remove non-desired parts associated with the manufacture, on the false nail, to shorten the false nail or to give the false nail a particular shape, such as a squarer, more pointed, more rounded or other edge.

Deposition of the Adhesive Composition and Deposition of the Coating

Step b) of deposition of the adhesive composition may be performed using a method chosen from the group formed by 2D printing, 3D printing, spraying, dipping and transfer, especially using a coarse brush, a fine brush, a roller, a foam or a pad.

Step c) of deposition of the coating onto the mold may be performed so as to at least partly, especially totally, cover the layer of adhesive composition.

The step of depositing the coating onto the mold may be performed so as to cover at least one zone of the mold not covered with the layer of adhesive composition. It is, for example, an extension of the nail going beyond the natural nail.

Steps b) and c) of the process may be performed so that the layer of adhesive composition has a different pattern from that formed by the coating. In this case, the layer of adhesive composition forms a pattern extending, for example, over all or part of the periphery of the pattern formed by the coating.

The deposition of the coating in step c) is performed, for example, using a method chosen from the group formed by thermo-forming, 2D printing, 3D printing, injection, dipping and transfer, especially using a coarse brush, a fine brush, a roller, a foam or a pad.

The second material intended to form the coating may be, before deposition onto the mold, in solid form, especially in the form of a sheet, or in liquid form, especially in molten form, dissolved and/or partially or totally crosslinked.

The term "crosslinked" means that a compound can, either alone, or by reaction with a second compound, or, for example, by the action of radiation or an input of energy, create covalent bonds between the molecules, the result being an increase in the cohesion of the material comprising this compound.

The term "partially crosslinked" means that the second material has a degree of crosslinking of less than 100%, and preferably less than 50%, or that less than 100%, and preferably less than 50%, of the crosslinkable functions have reacted.

The term "totally crosslinked" means that the degree of crosslinking of the second material is advantageously greater than 90%, preferably greater than 95% and more preferentially equal to 100%.

The process may comprise the step consisting in exposing the coating layer to energetic radiation, especially radiation from a UV lamp, in particular after deposition onto the mold in step c). There may then be one or more exposures to radiation. When there are several exposures, they may be of predefined durations, for example equal to each other, and may take place at predefined time intervals, for example regular intervals, two exposures being separated by a period without exposure.

The coating layer may be deposited so as to form a protruding portion on one face, the coating layer possibly having a non-constant thickness.

As a variant, the coating layer may be deposited so as to be smooth on the outer face of the false nail or to have a substantially constant thickness, or even to be entirely of constant thickness.

First Material Forming the Mold

The first material is advantageously a hot-melt material. This may make it possible to facilitate the physical and/or chemical degradation, especially physical degradation, of the mold for the extraction of the false nail. Such a hot-melt material may moreover be readily used for additive manufacture, especially 3D printing.

The hot-melt material preferably has a melting point of greater than 45° C., and more preferably between 45° C. and 200° C.

For the purposes of the invention, the melting point corresponds to the temperature of the most endothermic peak observed on thermal analysis (DSC) as described in standard ISO 11357-3; 1999. The melting point may be measured using a differential scanning calorimeter (DSC), for example the calorimeter sold under the name MDSC 2920 by the company TA Instruments.

The measurement protocol is as follows:

A 5 mg sample placed in a crucible is subjected to a first temperature rise from −20° C. to 100° C., at a heating rate of 10° C./minute, is then cooled from 100° C. to −20° C. at a cooling rate of 10° C./minute and is finally subjected to a second temperature rise ranging from −20° C. to 100° C. at a heating rate of 5° C./minute. During the second temperature rise, the variation of the difference in power absorbed by the empty crucible and by the crucible containing the sample is measured as a function of the temperature. The melting point of the sample is the temperature value corresponding to the top of the peak of the curve representing the variation in the difference in power absorbed as a function of the temperature.

In particular, the hot-melt material may be chosen from waxes, thermoplastic polymers and/or semicrystalline polymers, and is preferably chosen from waxes.

In this latter case, the hot-melt material is advantageously chosen from waxes of animal, plant, mineral or synthetic origin, in particular chosen from ester waxes, in particular fatty acid ester waxes and preferably ester waxes of fatty acid and of polyol, alcohol waxes, paraffin waxes, and silicone waxes, preferably an alcohol wax, and more preferentially cetyl alcohol and/or stearyl alcohol.

According to the invention, the term "ester wax" means a wax comprising at least one ester function. Use may especially be made, as ester waxes, of a wax chosen from the waxes of formula $R_1COOR_2$ in which $R_1$ and $R_2$ represent linear, branched or cyclic aliphatic chains in which the number of atoms ranges from 10 to 50, which may contain a heteroatom such as O, N or P, bis(1,1,1-trimethylolpropane) tetrastearate, sold under the name Hest 2T-4S® by the company Heterene, diester waxes of a dicarboxylic acid of general formula $R^3$—(—OCO—$R^4$—COO—$R^5$) in which $R^3$ and $R^5$ are identical or different, preferably identical, and represent a $C_4$-$C_{30}$ alkyl group (alkyl group comprising from 4 to 30 carbon atoms) and $R^4$ represents a linear or branched $C_4$-$C_{30}$ aliphatic group (alkyl group comprising from 4 to 30 carbon atoms) which may or may not contain one or more unsaturations, and is preferably linear and unsaturated.

According to another embodiment, the wax can be an alcohol wax. According to the invention, the term "alcohol wax" means a wax comprising at least one alcohol function, i.e. comprising at least one free hydroxyl (OH) group. Examples of alcohol waxes that may be mentioned include the $C_{30-50}$ alcohol wax Performacol® 550 Alcohol sold by the company New Phase Technologies, stearyl alcohol and cetyl alcohol.

The term "silicone wax" means an oil comprising at least one silicon atom and especially comprising Si—O groups. Among the commercial silicone waxes of this type, mention may be made in particular of those sold under the names Abilwax 9800, 9801 or 9810 (Goldschmidt), KF910 and KF7002 (Shin-Etsu), or 176-1118-3 and 176-11481 (General Electric). The silicone waxes that may be used may also be substituted polysiloxanes, alkyl or alkoxy dimethicones, and also ($C_{20}$-$C_{60}$)alkyl dimethicones, in particular ($C_{30}$-$C_{45}$) alkyl dimethicones, such as the silicone wax sold under the name SF-1642 by the company GE-Bayer Silicones or $C_{30-45}$ alkyl dimethylsilyl polypropylsilsesquioxane under the name SW-8005® C30 Resin Wax sold by the company Dow Corning.

For the purposes of the present invention, the term "thermoplastic polymer" means a polymer which softens when hot and which can be molded while retaining its shape after cooling. The thermoplastic polymers that can be used in the context of the present invention are any polymer or copolymer or any blend of polymers and/or copolymers having the property of being thermoplastic. Among the thermoplastic polymers, mention may in particular be made of polyethylene, polystyrene, polyamides, polyvinyl chloride, polyethylene terephthalate, and mixtures thereof. Mention may also be made of aliphatic polyesters, and in particular polyhydroxyalkanoates (PHAs), such as poly-3-hydroxybutyrate (PHB), polyhydroxyvalerate (PHV) or polyhydroxyhexanoate (PHH), polylactic acids (PLAs), polybutylene succinates (PBSs), polycaprolactones (PCLs), polyanhydrides, polyvinyl alcohols, and derivatives thereof, acetate esters, such as acetate/polyvinyl (PVAc) copolymer, starch derivatives, polysaccharides, including in particular cellulose derivatives such as cellulose esters, and derivatives thereof, in particular celluloids or cellulose ethers, and mixtures thereof. In particular, among the cellulose esters, mention may be made of cellulose acetate, cellulose triacetate, cellulose propionate, cellulose acetate propionate, cellulose acetate butyrate, and cellulose sulfate, and mixtures thereof. Among the cellulose ethers, mention may in particular be made of methylcellulose, ethylcellulose, ethylmethylcellulose, hydroxyethylcellulose, hydroxypropylcellulose (HPC), hydroxyethylmethylcellulose, hydroxypropylmethylcellulose (HPMC), ethylhydroxyethylcellulose, carboxymethylcellulose (CMC), and mixtures thereof. Among the acetate esters, mention may in particular be made of acetate/polyvinyl copolymers, including in particular ethylene-vinyl acetate (EVA) and derivatives thereof. For example, mention may be made of EVA/ethylcellulose or EVA/starch copolymers.

For the purposes of the invention, the term "semicrystalline polymer" means polymers comprising a crystallizable portion and an amorphous portion and having a first-order reversible change of phase temperature, in particular of melting point (solid-liquid transition).

The semicrystalline polymers of the invention may be of synthetic origin. In particular, the semicrystalline polymer may be chosen from homopolymers and copolymers comprising units resulting from the polymerization of one or more monomers bearing crystallizable hydrophobic side chains, polymers bearing in the backbone at least one crystallizable block, polycondensates of aliphatic or aromatic or aliphatic/aromatic polyester type, copolymers of ethylene and of propylene prepared by metallocene catalysis, and acrylate/silicone copolymers.

The semicrystalline polymers that may be used in the invention may be chosen in particular from block copolymers of polyolefins with controlled crystallization, the monomers of which are described in EP 0 951 897, polycondensates especially of aliphatic or aromatic or aliphatic/aromatic polyester type, copolymers of ethylene and of propylene prepared by metallocene catalysis, homopolymers or copolymers bearing at least one crystallizable side chain and homopolymers or copolymers bearing in the backbone at least one crystallizable block, such as those described in patent U.S. Pat. No. 5,156,911, homopolymers or copolymers bearing at least one crystallizable side chain in particular bearing fluoro group(s), as described in document WO 01/19333, acrylate/silicone copolymers, and mixtures thereof.

Adhesive Composition

The adhesive composition is applied to be present on the false nail, so as to allow the false nail to be fixed onto the user's nail, without mandatorily requiring the addition of an additional adhesive to the nail.

The invention also allows positioning on the nail, since it should be taken into account that false nails are light parts and an involuntary movement may take place. Thus, the adhesive composition may serve to give a first adhesion by very light pressure, which is non-permanent, and to aid in positioning the false nail on the nail. When the person handling the false nail so desires, she may exert a stronger pressure on the false nail, which is correctly positioned, so as to fix it securely to the nail. For example, it becomes possible, by means of the invention, to position the 10 false nails onto the 10 fingers and to do so by virtue of this first adhesion such that the false nails do not move. Then, when it is considered that the false nails are all in position and correctly positioned, the operator can force the adhesion, for example by pressing strongly on each of the false nails.

The false nail is already equipped with its adhesive at the time of its application.

The false nail may be packaged with the adhesive on its inner face, before being proposed to the user. This packaging may be done in a box or a bag, for example.

The adhesive composition comprises, for example, at least one adhesive compound and a solvent.

In this case, the adhesive compound may be chosen from pressure-sensitive adhesives, especially in dissolved or dispersed form, dissolved adhesives, and glues.

The pressure-sensitive adhesives are chosen especially from polymers with a glass transition temperature Tg of less than or equal to 0° C., preferably between 0° C. and −100° C., and preferably chosen from polyolefins, polyesters, polyurethanes and polyacrylates.

The glass transition temperature is measured in accordance with the protocol described in patent applications EP 845 257 and EP 848 941 at a temperature of 25° C.±1° C. and at a relative humidity of 46%±2%.

The dissolved adhesives are preferably chosen from polysaccharides, proteins, polyisoprene polymers and cellulose-based polymers.

In general, the adhesives may be of plant origin, such as tuber starches, cereal starches, dextrins, ethers, esters, celluloses, natural gums and gum arabics, of animal origin, such as gelatins, albumins, casein, collagen and derivatives thereof, of mineral origin, such as silicates, or alternatively synthetic, such as acrylate, acrylic, methacrylate, methacrylic or vinyl copolymers, in particular polystyrene-butadiene, polyneoprene, polychloroprene and polyisoprene.

The glues are generally thermosetting glues or reactive glues, and in particular one-component or two-component reactive glues.

The thermosetting glues may especially be hot-melt glues.

In the case of reactive one-component glues, they are especially chosen from compositions based on acrylate, based on vinyl monomers or based on oligomers bearing a reactive function. The one-component reactive glues may be used with a photoinitiator.

For example, mention may be made of the glue SoliQ. It is understood that, after application of the product, it is advantageous to activate the first setting, for example via UV exposure.

In the case of two-component reactive glues, they are chosen especially from systems comprising a polyepoxide and a nucleophilic compound, for example chosen from polyamines, such as ethylenediamine, diethylenetriamine, triethylenetetramine and isophoronediamine, polyphenols and polyols. For example, the polyepoxide may be based on a diglycidyl, and in particular on diglycidyl bisphenol A or on cycloaliphatic diglycidyls.

In this case, in a particular embodiment, only one of the components is deposited during the step of deposition of the adhesive composition, the other component being intended to be deposited on the nail before fixing the false nail onto the nail.

Second Material Forming the Coating

The coating may define the visual appearance of the false nail.

The second material forming the coating, which is advantageously different from the first material, may be chosen from thermoplastic polymers and thermosetting polymers.

Among the thermoplastic polymers, mention may be made especially of those mentioned previously. Advantageously, the thermoplastic polymers are chosen from polyethylene, polystyrene, acrylonitrile butadiene styrene, polyamides, polyvinyl chloride, polyethylene terephthalate and cellulose acetate.

Among the thermosetting polymers, the choice is advantageously made from polyurethanes, phenol-formaldehyde resins, urea-formaldehyde resins, melamine resins, diallyl phthalates, epoxy resins, polyimides and polyester resins.

Among the polyurethanes, mention may be made of anionic, cationic, nonionic or amphoteric polyurethanes, acrylic polyurethanes, polyvinylpyrrolidone-polyurethanes, polyester-polyurethanes, polyether-polyurethanes, polyureas, polyurea/polyurethanes and silicone polyurethanes, and mixtures thereof.

The coating may provide its mechanical cohesion to the false nail.

It may be covered with one or more decorative layers, for example deposited by printing or using a brush.

The coating may comprise any colorant or pigment for giving it the desired appearance.

The coating may receive any surface treatment aimed at giving it the desired appearance.

The second material may comprise at least one dyestuff.

This (or these) dyestuff(s) is (are) chosen in particular from pulverulent substances, liposoluble dyes and water-soluble dyes, and mixtures thereof.

The pulverulent dyestuffs may be chosen from pigments and nacres. The pigments may be white or colored, mineral and/or organic, and coated or uncoated. Among the mineral pigments, mention may be made of metal oxides, in particular titanium dioxide, optionally surface-treated, zirconium, zinc or cerium oxides, and also iron, titanium or chromium oxides, manganese violet, ultramarine blue, chromium hydrate and ferric blue. Among the organic pigments that may be mentioned are carbon black, pigments of D & C type and lakes based on cochineal carmine or on barium, strontium, calcium or aluminum. The nacres may be chosen from white nacreous pigments such as mica coated with titanium or with bismuth oxychloride, colored nacreous pigments such as titanium mica with iron oxides, titanium mica with in particular ferric blue or chromium oxide, titanium mica with an organic pigment of the abovementioned type, and also nacreous pigments based on bismuth oxychloride. Examples of nacres that may also be mentioned include natural mica coated with titanium oxide, with iron oxide, with natural pigment or with bismuth oxychloride. Among the nacres available on the market, mention may be made of the nacres Timica, Flamenco and Duochrome (based on mica) sold by the company Engelhard, the Timiron nacres sold by the company Merck, the Prestige mica-based nacres sold by the company Eckart, and the Sunshine synthetic mica-based nacres sold by the company Sun Chemical. The nacres may more particularly have a yellow, pink, red, bronze, orangey, brown, gold and/or coppery color or glint.

The liposoluble dyes are, for example, Sudan Red, D&C Red 17, D&C Green 6, β-carotene, soybean oil, Sudan Brown, D&C Yellow 11, D&C Violet 2, D&C Orange 5, quinoline yellow and annatto.

False Nail

According to another of its aspects, in combination with the foregoing, a subject of the invention is also a false nail obtained by the manufacturing process as defined above.

The false nail thus manufactured comprises a layer formed from at least one adhesive composition, on a face intended to come into contact with the nail, and at least one layer of a coating. It is perfectly adapted to the shape of the relief of the nail onto which it is intended to be fixed, due to the tailor-made shape of the mold used for its manufacture. Finally, its application is facilitated since there is no subsequent and additional step of adjusting the false nail or of applying an adhesive to the nail. This allows anybody to perform the application of the false nail.

Additive Manufacturing Machine

According to another of its aspects, in combination with the foregoing, a subject of the invention is also an additive manufacturing machine, especially for 3D printing, used for performing the manufacturing process as defined above, configured for 3D printing of the mold and optionally the coating and/or the adhesive composition.

The machine may also comprise a 3D scanner so as to scan the mold coated with adhesive in order to print the coating on the adhesive. The 3D scanner may also make it possible to perform the acquisition of the relief of the nail, mentioned above.

II—Second Process for Manufacturing a False Nail

According to another of its aspects, a subject of the invention is also a second process for manufacturing a false nail intended to cover a user's nail, comprising the following steps:

1) producing, by additive manufacture, by printing and/or by cutting-out, after 2D or 3D digital data acquisition of the nail, in a coating material comprising at least one partially crosslinked compound, a preform having at least one surface portion substantially equal to the developed surface of the nail, 2) finalizing the crosslinking of said coating material.

By means of the invention, the user can readily manipulate the preform, to fix it onto the nail, preferably before step 2).

Step 1) may be performed ex situ, i.e. away from the natural nail or final surface for receiving the false nail.

Steps 1) and 2) are advantageously performed successively, the finalization of the crosslinking taking place after the production of the preform, and preferably after it has been fixed onto the nail. Alternatively, they may be performed simultaneously.

The term "crosslinking" means that a compound can, either alone, or by reaction with a second compound, or, for example, by the action of radiation or an input of energy, create covalent bonds between the molecules, the result being an increase in the cohesion of the material comprising this compound.

Positioning of the Preform

The process may comprise, between steps 1) and 2), a step of positioning of the preform on the user's nail, so as to match the shape of the nail. Step 2) of finalization of the crosslinking may be performed on the nail or elsewhere, while conserving in the latter case the shape of the nail given to the preform.

As a variant, the process may comprise, between steps 1) and 2), a step of positioning of the preform on a support, especially a support simulating the nail, so as to match the shape of the support.

In this case, the support simulating the nail may be formed by a mold in the shape of the nail. This mold may be made by 3D printing, where appropriate, after acquisition of the relief of the nail. The crosslinking finalization step may be performed after removing the preform from the support simulating the shape of the nail or, on the contrary, may take place on this support.

Acquisition of the Relief of the Nail

The process may, before step 1), comprise the acquisition of 2D or 3D digital data of the relief of the nail or of a developed surface of the nail, the production of the preform taking place using these digital data, especially by calculating a developed surface of the nail.

The acquisition of the relief may comprise scanning, using an acquisition means, of the end of a user's finger, followed by isolation of a nail part of said scan, resulting in the creation of digital data. The manufacture of a preform corresponding at least partially to the developed surface of the nail may be performed using said digital data.

To acquire the data required for calculating the developed surface of the nail, an acquisition means may be used to scan the end of a person's finger. The acquisition means may be of any type: 3D scanner, photography camera, video camera or the like. Data processing means are also used to isolate the nail part of the end of the finger, to determine therefrom the developed surface of the nail and optionally to extend this developed surface to add the additional surface portion, so as to determine the contour of the preform therefrom.

As a variant, the determination of the developed surface may be performed at least partly manually using a molding paste, for example a silicone paste, to mold the nail part of the finger. The paste can then be pressed on a flat surface after molding and removal of the finger to obtain the developed surface of the nail. The digital data, especially 2D data, of the developed surface may then be acquired, for example using an acquisition means as mentioned previously, and the contour of the desired preform may be produced on the basis of these digital data.

The term "3D scanner" means a machine for scanning and acquiring images in three dimensions. The 3D scanner is thus a machine which analyzes the end of the user's finger including the nail, to collect precise information regarding the relief, the shape and optionally the appearance thereof.

The 3D scanner may use any type of scanning technology and may be, for example, of the contact or non-contact type, preferably non-contact. Among the 3D scanners that may be used, mention may be made of the non-contact active scanner, the phase-shift scanner, the fringe-projection structured-light scanner, the multi-angle photography scanner, the manual or automatic laser triangulation scanner, the conoscopic holography laser scanner, the stereoscopic scanner, the silhouette scanner, or the like.

Production of the Preform

Step 1) of producing the preform advantageously makes it possible to produce a tailor-made false nail, adapted to the shape of the nail.

Step 1) of producing the preform may comprise the cutting-out of a sheet of coating material to the desired shape. In this case, the cutting-out may be performed manually or automatically, especially using a punch or by laser. In one implementation example, the cutting-out is performed using a printed template as model.

Step 1) of producing the preform may, as a variant, be performed using an additive manufacturing device, especially by 3D printing or by stereolithography.

As a further variant, step 1) may be performed using a 2D printer that is capable of depositing the coating material in a liquid form on a support. A single layer of coating material may be deposited.

As a variant, several layers are deposited successively, in superposition, each layer having, for the partially crosslinked compound, a degree of crosslinking which is identical to or different from that of another layer. Partial crosslinking may be performed simultaneously with the printing of each layer or once all of the layers have been deposited. When several layers are deposited successively, one of them may comprise a non-crosslinked compound. The sparingly crosslinked or non-crosslinked layer(s) may in particular be one or two outer layers. The sparingly crosslinked or non-crosslinked layer(s) may also be at least one inner layer.

The interest of having a moderately crosslinked main inner layer and a sparingly crosslinked or non-crosslinked upper layer is that the main layer can provide mechanical behavior which allows handling of the part, while the upper layer constitutes an anti-oxygen protection.

The interest of having a moderately crosslinked main inner layer and a sparingly crosslinked or non-crosslinked lower layer is that the main layer can provide mechanical behavior which allows handling of the part, while the sparingly crosslinked or non-crosslinked lower layer allows a form of adhesion.

It is also advantageous to have a sparingly crosslinked or non-crosslinked inner layer sandwiched between further crosslinked lower and upper layers, since the latter layers can provide mechanical behavior while the intermediate layer provides a form of adhesion between these layers.

The upper and lower layers also constitute outer layers offering little adhesion, allowing the part to be readily handled, the inner layer providing flexibility thereto.

In yet another variant, step 1) of producing the preform is performed by depositing the coating material onto a flexible support, especially by printing.

Step 1) of producing the preform may be preceded by a step of printing on a support, especially on paper, of a pattern corresponding to the developed surface of the false nail to be made. Such a support may then serve as a template for cutting out the preform.

Preform

The preform is advantageously made so as to have a flat surface on at least one face, especially having a contour at least partially corresponding to the developed surface of the nail, preferably at least before deformation and/or finalization of the crosslinking.

The coating material for the preform is preferably deformable and flexible, at least before total crosslinking.

In particular, the material of the preform is advantageously chosen so that its Young's modulus E is between 100 kPa and 50 MPa, especially during the application of the preform to the nail, before total crosslinking of the coating material.

The preform may be deformed to adapt it to the curvature of the nail, by hand or by a tool.

The coating material constituting the preform is chosen so as to be at least 20% deformable before rupture, at the time of application to the nail.

To measure the deformability, the tests are performed on a machine sold under the name Lloyd, reference LR5K, or sold under the name Zwick, under the same temperature and humidity conditions as for the drying, i.e. a temperature of 22±2° C. and a relative humidity of 50±5%. The specimens are drawn at a speed of 1 mm/s and the distance between the jaws is 50±1 mm. The experiment consists in drawing up to the point of breakage.

Preferably, the deformation is sufficiently plastic so that, when the stressing of the preform is stopped, it does not immediately resume its initial shape. The tests are performed with the same machine, making it possible to identify the instantaneous recovery characteristics ($R_i$).

The process is performed as follows:
the specimen is drawn by 20% ($E_{max}$), i.e. 1.2 times its initial length ($I_0$);
the stress is removed and the elongation of the specimen is measured, after return to zero load ($E_i$).

The percentage instantaneous recovery ($R_i$) is given by the following formula:

$$R_i = ((E_{max} - E_i)/E_{max}) \times 100$$

Preferably, the instantaneous recovery $R_i$ of the preform according to the invention at the time of its application to the nail is less than or equal to 50%, better still 25%.

The preform is preferably made of a coating material chosen so that the preform is sufficiently cohesive to be able to be manipulated, at least between steps 1) and 2). This is only optional, since it is possible for the user to not detach the part from its support immediately and to bring the whole toward the nail, then place in contact and conform the whole to the nail. Next, the support may be removed and crosslinked. As a variant, crosslinking is performed, and the support is then removed.

Partially Crosslinked Compound

As indicated previously, the coating material for the preform comprises at least one compound that is only partially crosslinked.

The term "partially crosslinked" means that the compound has a degree of crosslinking of less than 100%, and preferably less than or equal to 50%, or that less than 100%, and preferably less than 50%, of the crosslinkable functions have reacted.

The degree of crosslinking may be measured via the chemical analysis methods that are well known to those skilled in the art.

The compound may be a simple molecule or may be the result of the combination of several molecules, for example oligomers or polymers. The compound may bear one or more reactive functions.

The chemical functions may react with another function of the same nature or may react with another chemical function.

They are, for example, ethylenic or polyethylenic functions, especially acrylate, acrylic, methacrylate, methacrylic, styrene or isoprene functions.

Thus, the coating material preferably comprises a compound chosen from polymers or oligomers bearing acrylate and/or methacrylate functions, optionally in combination with acrylate and/or methacrylate monomers, and/or polymers, oligomers and/or monomers bearing vinyl functions.

The compound of the coating material may comprise at least one chemical initiator, and/or at least one photoinitiator.

Chemical initiators that may especially be mentioned include azobisisobutyronitrile (AIBN), azobisdimethylvaleronitrile, 2,2-azobis[2-amidinopropane]hydrochloride (ABAH), or oxidizing agents, such as peroxides, and especially organic peroxides such as dilauryl peroxide, benzoyl peroxide and tert-butyl hydroperoxide, mineral peroxide compounds such as potassium persulfate or ammonium persulfate, or hydrogen peroxide.

Representative conventional photoinitiators that may especially be mentioned include thioxanthone, rose bengal, phloxine, eosin, erythrosine, fluorescein, acriflavine, thionine, riboflavin, proflavine, chlorophylls, hematoporphyrin, methylene blue, onium salts, pyridinium salts, benzophenones, and mixtures thereof, this list not being limiting.

Preferably, the compound of the coating material comprises at least one chemical initiator chosen in particular from oxidizing agents, especially persulfate, and/or at least one photoinitiator chosen in particular from onium salts, pyridinium salts and/or benzophenones.

Finalization of the Crosslinking

The term "finalization of the crosslinking" means that an additional crosslinking step is imposed on the compound of the coating material that is partially, but not totally, crosslinked beforehand. On conclusion of step 2) of finalization of the crosslinking, the degree of crosslinking of the compound is advantageously greater than 90%, preferably greater than 95% and more preferentially equal to 100%.

The finalization of the crosslinking may be performed thermally, photochemically and/or chemically, in the presence or absence of a catalyst. The execution of this crosslinking falls within the competence of a person skilled in the art.

The finalization of the crosslinking of step 2) is performed, for example, via illumination of said coating material of the preform with a light source with radiation in the UV range, exposure of said coating material of the preform to a source of heat and/or by means of the presence in said coating material of the preform of at least one chemical initiator and/or a photoinitiator, especially as defined previously.

Step 2) of finalization of the crosslinking may be performed, where appropriate, through a mask cut out by laser, by irradiation through said mask.

Deposition of a Protective Layer, Additional Treatment

The process may comprise a step of depositing a protective layer onto one or both faces of the preform obtained in step 1).

In this case, the protective layer may be removed before applying the false nail to the nail.

The process may comprise, between steps 1) and 2), at least one step of treating the nail and/or the preform with a varnish, a crosslinked or non-crosslinked, preferably non-crosslinked, UV gel, or an adhesive composition.

An adhesive composition comprises at least one adhesive compound which may be chosen from pressure-sensitive adhesives, especially in dissolved or dispersed form, dissolved adhesives, and glues.

False Nail

According to another of its aspects, in combination with the foregoing in II, a subject of the invention is also a false nail obtained by the second manufacturing process as defined above.

III—Third Process for Manufacturing a False Nail

According to another of its aspects, a subject of the invention is also a third process for manufacturing a false nail, comprising the following steps:
i. production, from 2D or 3D digital data of the nail, of a preform forming a reservoir having at least one surface portion substantially equal to the developed surface of a user's nail, ii. deposition onto the nail and/or onto the preform of a solidifiable composition to allow it to become filled with solidifiable composition, the latter comprising a partially crosslinked compound and/or a non-crosslinkable reactive compound, iii. positioning of the preform on the nail, iv. solidification of the solidifiable composition via finalization of crosslinking of the partially crosslinked compound and/or reaction of the non-crosslinkable reactive compound, so as to obtain the false nail.

Step ii) may be performed before and/or after step iii).

The process may comprise a step of depositing onto the nail a layer of at least one adhesive composition before step iii).

Step ii) may comprise exposure to energetic radiation, especially UV, of the solidifiable composition comprising a crosslinkable reactive compound in order to achieve partial crosslinking of said compound.

The term "crosslinked" means that a compound can, either alone, or by reaction with a second compound, or, for example, by the action of radiation or an input of energy, create covalent bonds between the molecules, the result being an increase in the cohesion of the material comprising this compound.

Acquisition of the Developed Surface of the Nail and Determination of the Contour of the Preform The process advantageously comprises a preliminary step of acquisition and/or calculation of the developed surface of the nail onto which the false nail will be applied. After acquisition of the relief of the nail, it is possible to determine therefrom, for example by data processing, the contour of the preform. This contour may comprise a surface portion corresponding to the developed surface of the nail. The contour may also comprise an additional surface portion, for example corresponding to an extension surface to achieve lengthening of the nail.

Once the contour of the preform has been defined, a print thereof may then be made on a support, which may be made of a porous or nonporous material.

To acquire the data required for determining the developed surface of the nail, an acquisition means may be used to scan the end of a person's finger. The acquisition means may be of any type: 3D scanner, photography camera, video camera or the like. Data processing means are also used to isolate the nail part of the end of the finger, to determine therefrom the developed surface of the nail and optionally to extend this developed surface to add the additional surface portion extending the nail, so as to determine the contour of the preform therefrom.

The determination of the developed surface may also be performed at least partly manually using a molding paste, for example a silicone paste, to mold the nail part of the finger. The paste can then be pressed on a flat surface after molding to obtain, after removal of the finger, the developed surface of the nail. An image of the developed surface thus obtained can then be processed and the desired contour of the preform can be determined. 2D data of the nail are obtained, which are useful for making the preform.

Production of the Preform

Step i) of producing the preform may be performed by cutting out from a sheet.

The cutting-out is advantageously performed by laser, automatically, from contour data generated previously. As a variant, the cutting-out may be performed manually, by manual cutting-out of a printed contour, by means of a cutting template, where appropriate, or by means of a punch.

Step i) of producing the preform may thus be preceded by a step of printing on a support, especially on paper, of the contour of the preform comprising at least the developed surface of the nail, so as to produce the cutting template.

As a variant, a rigid preform may be manufactured by 3D printing, from which a flexible mold is made, into which is poured a preparation (foam, paper paste), which, after drying, will become the porous preform.

The preform is advantageously made so as to have a substantially flat surface on at least one face, the preform being capable of adapting to the shape of the nail by deforming.

Preform Forming a Reservoir

The preform forming a reservoir may have at least one macroscopic cavity, for receiving the solidifiable composition. In this case, the preform is made such that the cavity opens to the exterior via at least one orifice. This makes it possible to fill the cavity of the preform with solidifiable composition. The insertion of a stopper or the covering of the preform with a clogging material may be performed to plug up the orifice so as to avoid any dissemination of traces of solidifiable composition. As a variant, such plugging may not be necessary when the solidifiable composition solidifies rapidly.

The preform may be made such that the cavity opens to the exterior via several orifices or, where appropriate, by means of a porous wall. This porous wall may be positioned against the nail so that the subsequent polymerization of the solidifiable composition introduced into the preform also acts as an adhesive between the nail and the false nail thus formed.

The preform forming a reservoir may be made of a porous material with or without a cavity as defined above. In the absence of a macroscopic cavity, it is the intrinsic porosity of the material which forms the reservoir.

For the purposes of the invention, the term "porous material" means that the material can absorb, either because the material absorbs by itself, or because the material is alveolar and thus contains microscopic empty zones, or because the material is in the form of woven or nonwoven filaments, or adjacent particles or sheets. Thus, the term "porous material" refers to any material that can take up or trap, by virtue of its intrinsic structure, the solidifiable composition for at least 10% of its weight, more preferably 30% of its weight. The porous material may have three-dimensional porosity.

The term "three-dimensional porosity" should be understood as meaning that the solidifiable composition can diffuse within the material in all directions, especially under the effect of capillary forces.

When the porous material is intrinsically absorbent, the solidifiable composition that is added must not dissolve the material.

The porous material is thus advantageously chosen from fibrous or alveolar materials. In one embodiment, the porous material is an alveolar material. Alveolar materials are media formed from a solid phase known as a backbone and an empty phase, in the sense of it being "filled with air". The solid phase has a morphology allowing the composition that is added to be able to circulate freely around the backbone.

The alveolar material is preferably chosen from alveolar materials of animal, plant and chemical origin.

For example, the alveolar materials of animal origin may be chosen from sponges. As alveolar materials of plant origin, mention may be made of loofah.

The alveolar materials of chemical origin may be chosen from open-cell foams made of cellulose, polyurethane, lowdensity polyether, polyester, PVA, and silane-based foams, such as those described in FR 2 970 649.

In another embodiment, the porous material is a woven or nonwoven fibrous material chosen in particular from materials based on mineral fibers, fibers of animal origin, plant fibers and/or synthetic fibers. In this case, the fibers constituting the fibrous material can trap the solidifiable composition therein and/or in the intervals between the fibers.

For example, the materials based on mineral fibers may be chosen from glass fibers.

Wool constitutes an example of a material based on fibers of animal origin.

The material based on fibers of plant origin may be chosen from cotton, flax and hemp.

As illustrations of materials based on synthetic fibers, mention may be made of materials based on natural polymers, such as cellulose derivatives, materials based on synthetic polymers, such as polyamides, in particular PA 6.6 and PA 6.0, sold especially under the names Nylon® and Perlon®, polyesters, polyethylene terephthalate (PET), polybutylene terephthalate (PBT), polyvinyl chloride (PVC), polypropylene (PP) and polyethylene (PE), and mixtures thereof.

Solidifiable Composition

The solidifiable composition comprises at least one partially crosslinked compound and/or one non-crosslinkable reactive compound.

The solidifiable composition according to the present invention is not solid at room temperature before the solidification step iv); in other words, it has flow properties.

Thus, a solidifiable composition according to the invention may have a viscosity of less than 1000 Pa·s, preferably between $10^{-3}$ Pa·s and 200 Pa·s, preferably between 0.05 Pa·s and 50 Pa·s, at room temperature and pressure, measured using a Brookfield LVT viscometer at 60 rpm.

The solidifiable composition used in the context of the present invention is advantageously chosen so that its mechanical properties change over time. Thus, the composition becomes more rigid after its application.

The solidifiable composition according to the invention lends itself to solidification via finalization of the crosslinking of the partially crosslinked compound and/or reaction of the non-crosslinkable reactive compound.

According to a first aspect of the present invention, the solidifiable composition comprises at least one partially crosslinked compound, and solidification takes place via finalization of the crosslinking of said compound.

The term "partially crosslinked" means that the compound has a degree of crosslinking of less than 100%, and preferably less than 50%, or that less than 100%, and preferably less than 50%, of the crosslinkable functions have reacted.

The degree of crosslinking may be measured via the chemical analysis methods that are well known to those skilled in the art.

The compound may be a simple molecule or may be the result of the combination of several molecules, for example oligomers or polymers. The compound may bear one or more reactive functions.

The chemical functions may react with another function of the same nature or may react with another chemical function.

They are, for example, ethylenic or polyethylenic functions, especially acrylate, acrylic, methacrylate, methacrylic, styrene or isoprene functions.

The solidifiable composition preferably comprises at least one partially crosslinked compound chosen from polymers or oligomers bearing acrylate and/or methacrylate functions, optionally in combination with acrylate and/or methacrylate monomers, and/or polymers, oligomers and/or monomers bearing vinyl functions.

The solidifiable composition may also comprise at least one chemical initiator, and/or at least one photoinitiator.

Chemical initiators that may especially be mentioned include azobisisobutyronitrile (AIBN), azobisdimethylvaleronitrile, 2,2-azobis[2-amidinopropane]hydrochloride (ABAH), or oxidizing agents, such as peroxides, and especially organic peroxides such as dilauryl peroxide, benzoyl peroxide and tert-butyl hydroperoxide, mineral peroxide compounds such as potassium persulfate or ammonium persulfate, or hydrogen peroxide $H_2O_2$.

Representative conventional photoinitiators that may especially be mentioned include thioxanthone, rose bengal, phloxine, eosin, erythrosine, fluorescein, acriflavine, thionine, riboflavin, proflavine, chlorophylls, hematoporphyrin, methylene blue, onium salts, pyridinium salts, benzophenones, and mixtures thereof, this list not being limiting.

Preferably, the solidifiable composition comprises at least one chemical initiator chosen in particular from oxidizing agents, especially persulfate, and/or at least one photoinitiator chosen in particular from onium salts, pyridinium salts and/or benzophenones.

The term "finalization of the crosslinking" means that an additional crosslinking step is imposed on the compound of the solidifiable composition that is partially, but not totally, crosslinked beforehand. On conclusion of the step of finalization of the crosslinking, the degree of crosslinking of the compound is advantageously greater than 90%, preferably greater than 95% and more preferentially equal to 100%.

The finalization of the crosslinking may be performed thermally, photochemically and/or chemically, in the presence or absence of a catalyst. The execution of this crosslinking falls within the competence of a person skilled in the art.

Activation of finalization of the crosslinking of step iv) is performed, for example, via illumination of said solidifiable composition with a light source with radiation in the UV range.

According to another embodiment, activation of finalization of the crosslinking of step iv) is performed via exposure of said solidifiable composition to a heat source.

According to another embodiment, activation of finalization of the crosslinking of step iv) is performed at least partly chemically, the solidifiable composition comprising at least one chemical initiator chosen in particular from oxidizing agents, especially persulfate, and/or a photoinitiator chosen in particular from onium salts, pyridinium salts and/or benzophenones.

It is understood that activation of finalization of the crosslinking may take place via one or more of the means mentioned above.

According to a second aspect of the present invention, the solidifiable composition comprises at least one non-crosslinkable reactive compound, and solidification takes place via reaction of said compound. It is understood that the reaction of the compound is then different from a crosslinking reaction.

For the purposes of the invention, a non-crosslinkable reactive compound is a compound or a species which reacts characteristically in response to a physical or chemical stimulus.

Such a compound is chosen, for example, from epoxy resins. These compounds bear at least two epoxide groups and are mixed with a di- or polynucleophilic compound, for instance a diamine, such as ethylenediamine, diethylenetriamine, triethylenetetramine, isophorone diamine, methylene dianiline or diaminodiphenylmethane.

The systems used in glues of Araldite type are used in particular.

Thus, the reaction of the non-crosslinkable reactive compound leading to the solidification of the composition containing it is performed in response to a physical or chemical stimulus, such as the placing in contact with an activator.

In other words, in response to such a stimulus, the reactive compound is converted into a solid material, then inducing the solidification of the composition containing it.

In particular, the physical or chemical stimulus may be a variation in light, in pH, in temperature or in moisture content, or else the bringing into contact with at least one reagent.

Thus, the reaction of the non-crosslinkable reactive compound is, for example, an evaporation, condensation, oxidation or coagulation reaction.

The reactions targeted by the invention preferentially lead to the creation of covalent bonds or to a rearrangement of covalent bonds, it being understood that the change in the mechanical properties of the composition tends toward increasing its rigidity.

According to a particular embodiment, the reaction of the reactive compound causing solidification of the composition containing it may take place naturally. Thus, the solidification may take place via the action of an environmental factor such as heat, light or humidity.

The process according to the invention may, in a particular embodiment, comprise the following steps:
production of the preform forming the reservoir,
deposition onto the preform forming the reservoir of a solidifiable composition comprising a crosslinkable reactive compound,
exposure to UV radiation of the preform so that the reactive compound is partially crosslinked,
optionally, deposition onto the nail of the solidifiable composition comprising the crosslinkable reactive compound or of another composition, for example without crosslinkable compound, such as Araldite glue,
positioning of the preform on the nail,
exposure to UV radiation of the preform on the nail so as to finalize the crosslinking of the reactive compound.

In another particular embodiment, the process according to the invention may comprise the following steps:
production of the preform forming the reservoir,
deposition onto the nail of a solidifiable composition comprising a crosslinkable reactive compound,
positioning of the preform on the nail,
exposure to UV radiation of the preform on the nail so that the reactive compound is partially crosslinked,
optionally, deposition onto the preform of the solidifiable composition or of another composition, for example without crosslinkable compound,
exposure to UV radiation of the preform so as to obtain crosslinking of the reactive compound.

In another particular embodiment, the process according to the invention may comprise the following steps:
production of the preform forming the reservoir,
deposition onto the preform of a first solidifiable composition comprising a non-crosslinkable reactive compound,
deposition onto the nail of a second solidifiable composition comprising a second non-crosslinkable reactive compound,
positioning of the preform on the nail,
deposition onto the preform of the second solidifiable composition,
solidification of the solidifiable compositions by reaction of the reactive compounds.

False Nail

In combination with the foregoing in III, a subject of the invention is also a false nail obtained using the third manufacturing process as defined above.

IV—Fourth Process for Manufacturing a False Nail

According to another of its aspects, a subject of the invention is also a fourth process for manufacturing at least one false nail intended to be applied onto a nail, comprising the following steps:
A. manufacture of a mold comprising two shells in the shape of the false nail, one of which has a convex face toward the interior of the mold,
B. deposition of at least one layer formed from at least one adhesive composition onto said convex face,
C. injection of at least one coating material into the cavity of the mold,
D. extraction of the false nail from the mold.

The manufacture of the false nail thus comprises the at least partial production of the adhesive, which makes it possible to obtain, if so desired, a layer uniformly distributed at the desired places, without overrunning. The false nail thus manufactured comprises at least part of the adhesive constituted by said layer formed from at least the adhesive composition, and at least one coating material, advantageously providing all or part of the visual appearance of the false nail.

The process may be performed to make a false nail or, simultaneously, several false nails, for example for all the fingers of a person's hand or for both the hands. In this latter case, one or more molds for several false nails are made, and the adhesive composition and the coating are deposited onto each of the molds thus made.

The process may comprise a waiting time between steps B and C of between 5 and 30 minutes.

Acquisition of the Relief of the Nail and Manufacture of the Mold Shells

Step A may be preceded, to produce the tailor-made mold shells, by a step of acquisition of the relief of the nail, which may comprise scanning, for example using a 3D scanner, of the end of a user's finger, followed by isolation of a nail part of said scan, resulting in the creation of 3D digital data, and the creation of 3D objects forming the two shells of the mold from the 3D digital data. The 3D objects may be designed so as to form shells of a mold for manufacturing a false nail covering the nail and optionally lengthening it, for example by 5 mm in length. To do this, calculations from the 3D digital data may be made.

Thus, shells forming a tailor-made mold, which perfectly matches the relief of the nail concerned, may be obtained. The mold cavity is advantageously defined when the mold shells are assembled together, especially before the injection in step C.

The term "3D scanner" means a machine for scanning and acquiring images in three dimensions. The 3D scanner is thus a machine which analyzes the end of the user's finger including the nail, to collect precise information regarding the relief, the shape and optionally the appearance thereof.

The digital data thus collected may then be used to construct the digital 3D objects forming a synthetic three-dimensional image of the mold shells.

The 3D scanner may use any type of scanning technology and may be, for example, of the contact or non-contact type, preferably non-contact. Among the 3D scanners that may be used, mention may be made of the non-contact active scanner, the phase-shift scanner, the fringe-projection structured-light scanner, the multi-angle photography scanner, the manual or automatic laser triangulation scanner, the conoscopic holography laser scanner, the stereoscopic scanner, the silhouette scanner, or the like.

The mold shells may be made by additive manufacture, especially 3D printing, or by stereolithography, especially from the 3D digital data.

They may be made so as to give the false nail one or more patterns in relief. Alternatively, they may be made so as to form a false nail having a smooth surface and a constant or non-constant thickness.

Adhesive Composition

The adhesive composition is applied to be present on the false nail, so as to allow the false nail to be fixed onto the user's nail, without mandatorily requiring the addition of an additional adhesive to the nail.

The invention also allows positioning on the nail, since it should be taken into account that false nails are light parts and an involuntary movement may take place. Thus, the adhesive composition may serve to give a first adhesion by very light pressure, which is non-permanent, and to aid in positioning the false nail on the nail. When the person handling the false nail so desires, she may exert a stronger pressure on the false nail, which is correctly positioned, so as to fix it securely to the nail. For example, it becomes possible, by means of the invention, to position the 10 false nails onto the 10 fingers and to do so by virtue of this first adhesion such that the false nails do not move. Then, when it is considered that the false nails are all in position and correctly positioned, the operator can force the adhesion, for example by pressing strongly on each of the false nails.

The false nail is already equipped with its adhesive at the time of its application.

The step of depositing the adhesive composition is advantageously performed when the mold is open, i.e. when the two shells are separated from each other.

The step of depositing the adhesive composition may be performed using a method chosen from the group formed by 2D printing, 3D printing, spraying, dipping and transfer, especially using a coarse brush, a fine brush, a roller, a foam or a pad. The adhesive is readily deposited by means of the opening of the mold.

The false nail may be packaged with the adhesive on its inner face, before being proposed to the user. This packaging may be done in a box or a bag, for example.

The adhesive composition preferably comprises at least one adhesive compound and optionally a solvent.

The adhesive compound is preferably chosen from pressure-sensitive adhesives, especially in dissolved or dispersed form.

The pressure-sensitive adhesives are chosen especially from polymers with a glass transition temperature Tg of less than or equal to 20° C., preferably between 0° C. and −100° C., and more preferentially between 0° C. and −80° C.

The glass transition temperature is measured in accordance with the protocol described in patent applications EP 845 257 and EP 848 941 at a temperature of 25° C.±1° C. and at a relative humidity of 46%±2%.

Advantageously, these polymers have an adhesive (tackifying) effect. In particular, they produce "tack" in the event of contact at room temperature.

In general, the adhesives may be of plant origin, such as tuber starches, cereal starches, dextrins, ethers, esters, celluloses, natural gums and gum arabics, of animal origin, such as gelatins, albumins, casein, collagen and derivatives thereof, of mineral origin, such as silicates, or alternatively synthetic, such as acrylate, acrylic, methacrylate, methacrylic or vinyl copolymers, in particular polystyrene-butadiene, polyneoprene, polychloroprene and polyisoprene.

The dissolved adhesives are preferably chosen from acrylic polymers, styrene-based polymers and silicone elastomers.

More preferentially, the dissolved adhesives are preferably chosen from acrylic polymers, silicone elastomers, ethylene-vinyl acetates, styrene block copolymers, and styrene-butadiene-styrene polymers.

As indicated previously, the adhesive compound may be used in the adhesive composition with a solvent. In this embodiment, the adhesive compound advantageously maintains its adhesive power after evaporation of the solvent.

The adhesive is not necessarily a pressure-sensitive adhesive (PSA). For example, use may be made of an adhesive polymer with a Tg>0° C., such that if the user applies the part as it is, it does not bond, but, on the other hand, if the user wets it, the adhesive is dissolved and becomes tacky during the application.

Coating Material

The coating material of step c), which is injection-molded, is advantageously chosen from thermoplastic polymers and thermosetting polymers.

The coating may define the visual appearance of the false nail.

For the purposes of the present invention, the term "thermoplastic polymer" means a polymer which softens when hot and which can be molded while retaining its shape after cooling. The thermoplastic polymers that can be used in the context of the present invention are any polymer or copolymer or any blend of polymers and/or copolymers having the property of being thermoplastic. Among the thermoplastic polymers, mention may be made especially of polyolefins, such as polypropylene, polyethylene or ethylenic copolymers, especially Surlyn®, polystyrenes such as polystyrene, acrylonitrile butadiene styrene (ABS) and styrene acrylonitrile copolymer (SAN), polyamides, polyacrylates such as polyoxymethylene, polyvinyl chloride, polyethylene terephthalate, and mixtures thereof. Mention may also be made of aliphatic polyesters, and in particular polyethylene terephthalate (PET), polybutylene terephthalate (PBT), polyhydroxyalkanoates (PHAs), such as poly-3-hydroxybutyrate (PHB), polyhydroxyvalerate (PHV) or polyhydroxyhexanoate (PHH), polylactic acids (PLAs), polybutylene succinates (PBSs), polycaprolactones (PCLs), polyanhydrides, polyvinyl alcohols, and derivatives thereof, acetate esters, such as acetate/polyvinyl (PVAc) copolymer, starch derivatives, polysaccharides, including in particular cellulose derivatives such as cellulose esters, and derivatives thereof, in particular celluloids or cellulose ethers, and mixtures thereof. In particular, among the cellulose esters, mention may be made of cellulose acetate, cellulose triacetate, cellulose propionate, cellulose acetate propionate, cellulose acetate butyrate, and cellulose sulfate, and mixtures thereof. Among the cellulose ethers, mention may in particular be made of methylcellulose, ethylcellulose, ethylmethylcellulose, hydroxyethylcellulose, hydroxypropylcellulose (HPC), hydroxyethylmethylcellulose, hydroxypropylmethylcellulose (HPMC), ethylhydroxyethylcellulose, carboxymethylcellulose (CMC), and mixtures thereof. Among the acetate esters, mention may in particular be made of acetate/polyvinyl copolymers, including in particular ethylene-vinyl acetate (EVA) and derivatives thereof. For example, mention may be made of EVA/ethylcellulose or EVA/starch copolymers.

Advantageously, the thermoplastic polymers are chosen from polyolefins, such as polypropylene, polyethylene or ethylenic copolymers, polyesters such as polyethylene terephthalate (PET) and polybutylene terephthalate (PBT), polystyrene, acrylonitrile butadiene styrene, styrene acrylonitrile copolymer, polyamides, polyacrylates such as polyoxymethylene, polyvinyl chloride and cellulose acetate.

Among the thermosetting polymers, the choice is advantageously made from polyurethanes, phenol-formaldehyde resins, urea-formaldehyde resins, melamine resins, diallyl phthalates, epoxy resins, polyimides and polyester resins.

Among the polyurethanes, mention may be made of anionic, cationic, nonionic or amphoteric polyurethanes, acrylic polyurethanes, polyvinylpyrrolidone-polyurethanes, polyester-polyurethanes, polyether-polyurethanes, polyureas, polyurea/polyurethanes and silicone polyurethanes, and mixtures thereof.

The coating may provide its mechanical cohesion to the false nail.

The process may also comprise a step, especially after extraction of the false nail, which consists in covering the coating material with one or more decorative layers, which are deposited, for example, by printing.

The coating may comprise any colorant or pigment for giving it the desired appearance.

The coating may subsequently receive any surface treatment aimed at giving it the desired appearance.

The coating material may comprise at least one dyestuff.

This (or these) dyestuff(s) is (are) chosen in particular from pulverulent materials, liposoluble dyes and water-soluble dyes, and mixtures thereof.

The pulverulent dyestuffs may be chosen from pigments and nacres. The pigments may be white or colored, mineral and/or organic, and coated or uncoated. Among the mineral pigments, mention may be made of metal oxides, in particular titanium dioxide, optionally surface-treated, zirconium, zinc or cerium oxides, and also iron, titanium or chromium oxides, manganese violet, ultramarine blue, chromium hydrate and ferric blue. Among the organic pigments that may be mentioned are carbon black, pigments of D & C type and lakes based on cochineal carmine or on barium, strontium, calcium or aluminum. The nacres may be chosen from white nacreous pigments such as mica coated with titanium or with bismuth oxychloride, colored nacreous pigments such as titanium mica with iron oxides, titanium mica with in particular ferric blue or chromium oxide, titanium mica with an organic pigment of the abovementioned type, and also nacreous pigments based on bismuth oxychloride. Examples of nacres that may also be mentioned include natural mica coated with titanium oxide, with iron oxide, with natural pigment or with bismuth oxychloride. Among the nacres available on the market, mention may be made of the nacres Timica, Flamenco and Duochrome (based on mica) sold by the company Engelhard, the Timiron nacres sold by the company Merck, the Prestige mica-based nacres sold by the company Eckart, and the Sunshine synthetic mica-based nacres sold by the company Sun Chemical. The nacres may more particularly have a yellow, pink, red, bronze, orangey, brown, gold and/or coppery color or glint.

The liposoluble dyes are, for example, Sudan Red, D&C Red 17, D&C Green 6, β-carotene, soybean oil, Sudan Brown, D&C Yellow 11, D&C Violet 2, D&C Orange 5, quinoline yellow and annatto.

Extraction from the Mold

Extraction of the false nail may be performed by opening the mold by separating the shells.

As a variant, extraction of the false nail is performed by physical and/or chemical degradation of at least one of the shells of the mold.

In this case, the physical and/or chemical degradation may be at least partly performed by heating at least part of the material forming said at least one shell. The physical and/or chemical degradation may be, additionally or alternatively, at least partly a mechanical degradation consisting in hollowing out, for example using a high-pressure water cleaner.

The physical and/or chemical degradation may also at least partly be a chemical degradation, consisting, for example, of selective dissolution of the material forming said at least one shell using a solvent that is inert toward the adhesive composition and the coating material. In this case, the solvent is advantageously chosen from alkanes, such as isoalkanes comprising at least six carbon atoms and gaseous $C_1$-$C_5$ alkanes, ketones, such as acetone or ethyl ketone and methyl ketone, ethers, such as dimethyl ether or diethyl ether, and esters, such as alkyl acetates.

As a variant, the chemical degradation may consist of chemical transformation with an acid or an alkaline agent.

As nonlimiting illustrations of acids and alkaline agents that are suitable for use in the invention, mention may be made especially of salicylic acid, glycolic acid, citric acid, lactic acid, sodium hydroxide, potassium hydroxide, ammonia, monoethanolamine, triethanolamine, calcium hydroxide, alkaline salts of amino acids, such as glycinate salts, urea and urea derivatives, guanidine derivatives, in particular guanidine carbonate or guanidine hydroxide, made, for example, from guanidine carbonate and calcium hydroxide.

Degradation other than purely mechanical degradation of said at least one shell is advantageous insofar as it may make it possible to limit the damage of the layer of deposited adhesive composition, during the removal from the mold.

The material forming the shells of the mold may be a hot-melt material. This may make it possible to facilitate the physical and/or chemical degradation, especially physical degradation, of a shell of the mold, when it takes place, for the extraction of the false nail. Such a hot-melt material may moreover be readily used for additive manufacture, especially 3D printing.

The hot-melt material preferably has a melting point of greater than 45° C., and more preferably between 45° C. and 200° C.

For the purposes of the invention, the melting point corresponds to the temperature of the most endothermic peak observed on thermal analysis (DSC) as described in standard ISO 11357-3; 1999. The melting point may be measured using a differential scanning calorimeter (DSC), for example the calorimeter sold under the name MDSC 2920 by the company TA Instruments.

The measurement protocol is as follows:

A 5 mg sample placed in a crucible is subjected to a first temperature rise ranging from −20° C. to 100° C., at a heating rate of 10° C./minute, is then cooled from 100° C. to −20° C. at a cooling rate of 10° C./minute and is finally subjected to a second temperature rise ranging from −20° C. to 100° C. at a heating rate of 5° C./minute. During the second temperature rise, the variation of the difference in power absorbed by the empty crucible and by the crucible containing the sample is measured as a function of the temperature. The melting point of the sample is the temperature value corresponding to the top of the peak of the curve representing the variation in the difference in power absorbed as a function of the temperature.

In particular, the hot-melt material may be chosen from waxes, thermoplastic polymers and/or semicrystalline polymers, and is preferably chosen from waxes.

In this latter case, the hot-melt material is advantageously chosen from waxes of animal, plant, mineral or synthetic origin, in particular chosen from ester waxes, in particular fatty acid ester waxes and preferably ester waxes of fatty acid and of polyol, alcohol waxes, paraffin waxes, and silicone waxes, preferably an alcohol wax, and more preferentially cetyl alcohol and/or stearyl alcohol.

According to the invention, the term "ester wax" means a wax comprising at least one ester function. Use may especially be made, as ester waxes, of a wax chosen from the waxes of formula $R_1COOR_2$ in which $R_1$ and $R_2$ represent linear, branched or cyclic aliphatic chains in which the number of atoms ranges from 10 to 50, which may contain a heteroatom such as O, N or P, bis(1,1,1-trimethylolpropane) tetrastearate, sold under the name Hest 2T-4S® by the company Heterene, diester waxes of a dicarboxylic acid of general formula $R^3$—(—OCO—$R^4$—COO—$R^5$) in which $R^3$ and $R^5$ are identical or different, preferably identical, and represent a $C_4$-$C_{30}$ alkyl group (alkyl group comprising from 4 to 30 carbon atoms) and $R^4$ represents a linear or branched $C_4$-$C_{30}$ aliphatic group (alkyl group comprising from 4 to 30 carbon atoms) which may or may not contain one or more unsaturations, and is preferably linear and unsaturated.

According to another embodiment, the wax may be an alcohol wax. According to the invention, the term "alcohol wax" means a wax comprising at least one alcohol function, i.e. comprising at least one free hydroxyl (OH) group. Examples of alcohol waxes that may be mentioned include the $C_{30-50}$ alcohol wax Performacol® 550 Alcohol sold by the company New Phase Technologies, stearyl alcohol and cetyl alcohol.

The term "silicone wax" means an oil comprising at least one silicon atom and especially comprising Si—O groups. Among the commercial silicone waxes of this type, mention may be made in particular of those sold under the names Abilwax 9800, 9801 or 9810 (Goldschmidt), KF910 and KF7002 (Shin-Etsu), or 176-1118-3 and 176-11481 (General Electric). The silicone waxes that may be used may also be substituted polysiloxanes, alkyl or alkoxy dimethicones, and also ($C_{20}$-$C_{60}$)alkyl dimethicones, in particular ($C_{30}$-$C_{45}$) alkyl dimethicones, such as the silicone wax sold under the name SF-1642 by the company GE-Bayer Silicones or $C_{30-45}$ alkyl dimethylsilyl polypropylsilsesquioxane under the name SW-8005® C30 Resin Wax sold by the company Dow Corning.

For the purposes of the invention, the term "semicrystalline polymer" means polymers comprising a crystallizable portion and an amorphous portion and having a first-order reversible change of phase temperature, in particular of melting point (solid-liquid transition).

The semicrystalline polymers of the invention may be of synthetic origin. In particular, the semicrystalline polymer may be chosen from homopolymers and copolymers comprising units resulting from the polymerization of one or more monomers bearing crystallizable hydrophobic side chains, polymers bearing in the backbone at least one crystallizable block, polycondensates of aliphatic or aromatic or aliphatic/aromatic polyester type, copolymers of ethylene and of propylene prepared by metallocene catalysis, and acrylate/silicone copolymers.

The semicrystalline polymers that may be used in the invention may be chosen in particular from block copolymers of polyolefins with controlled crystallization, the monomers of which are described in EP 0 951 897, polycondensates especially of aliphatic or aromatic or aliphatic/aromatic polyester type, copolymers of ethylene and of propylene prepared by metallocene catalysis, homopolymers or copolymers bearing at least one crystallizable side chain and homopolymers or copolymers bearing in the backbone at least one crystallizable block, such as those described in patent U.S. Pat. No. 5,156,911, homopolymers or copolymers bearing at least one crystallizable side chain in particular bearing fluoro group(s), as described in document WO 01/19333, acrylate/silicone copolymers, and mixtures thereof.

Cutting-Out of the False Nail

The process may comprise a step of cutting-out of the false nail after it has been extracted from the mold.

In this case, the step of cutting-out of the false nail is performed, for example, manually or automatically, especially using a punch, a laser or water jet, a plasma or any other cutting-out technique.

This step may make it possible to remove non-desired parts associated with the injection, on the false nail, to shorten the false nail or to give the false nail a particular shape.

False Nail

In combination with the foregoing in IV, a subject of the invention is also a false nail obtained by the fourth manufacturing process as defined above.

FIGURES

Figure 8:
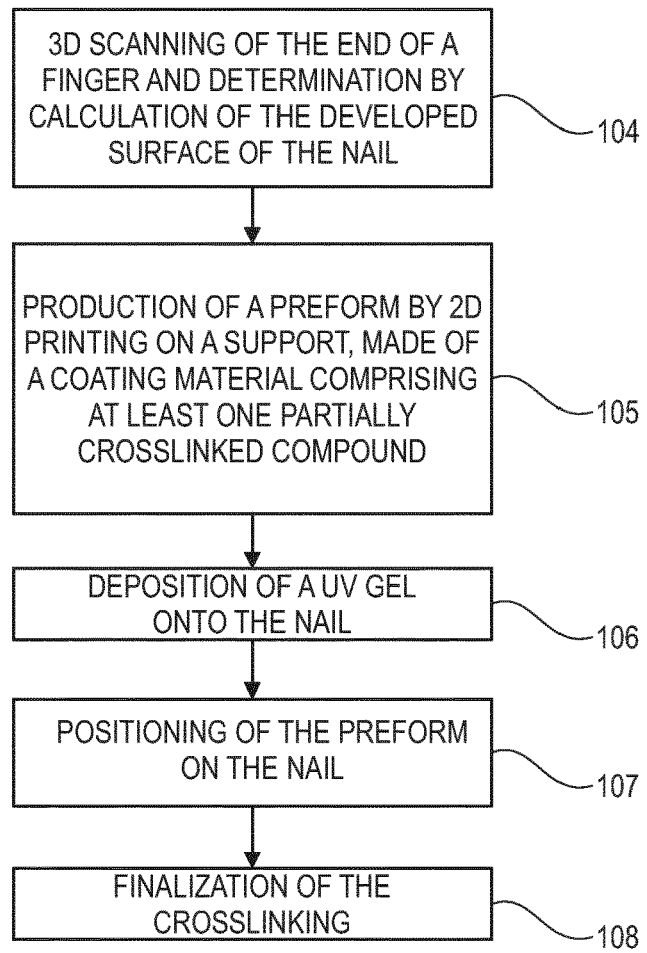
Figures 9, 10:
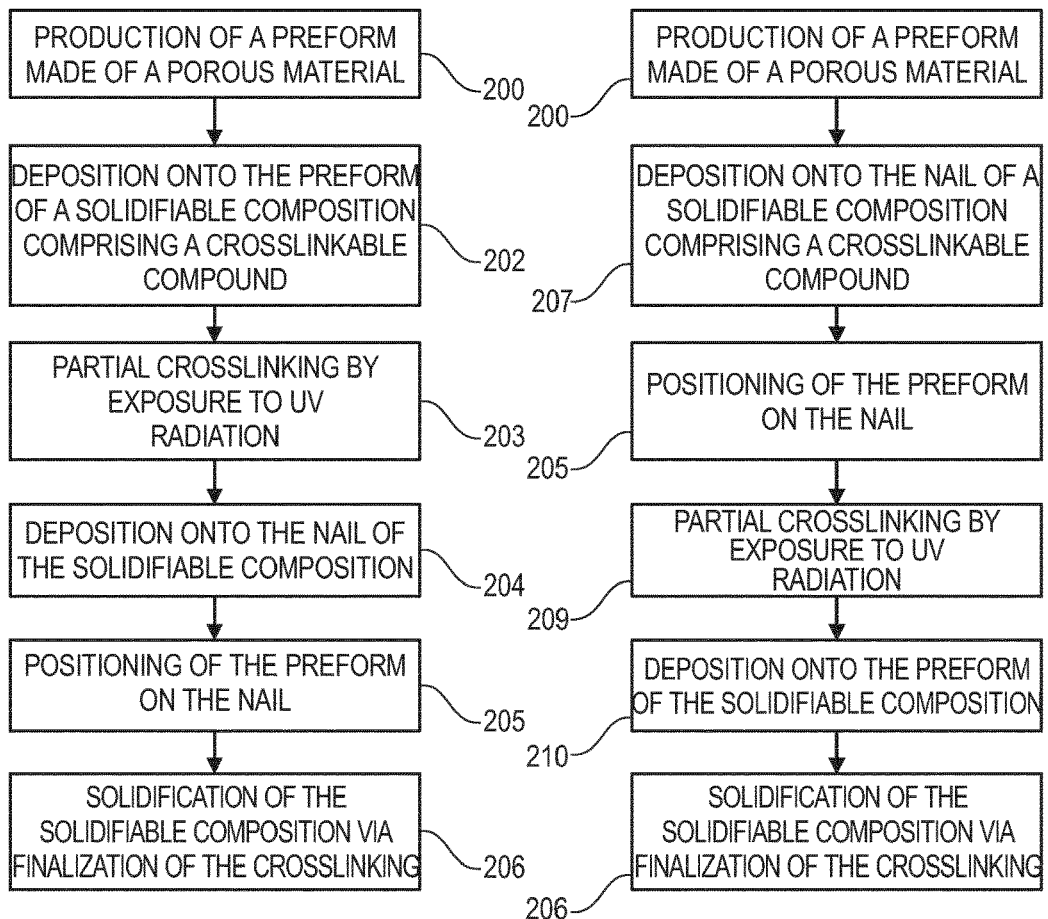
Figure 11:
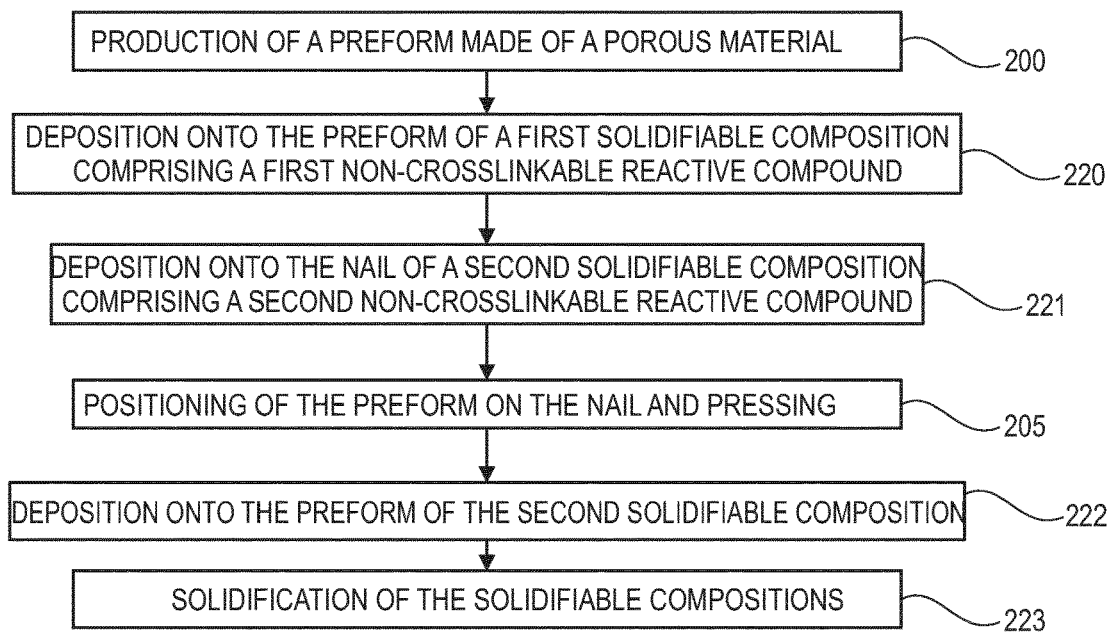
Figure 12:
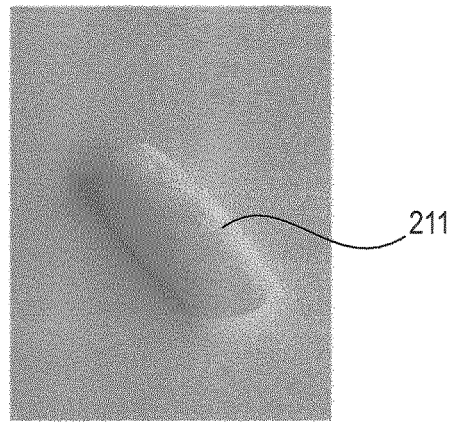
Figure 13:
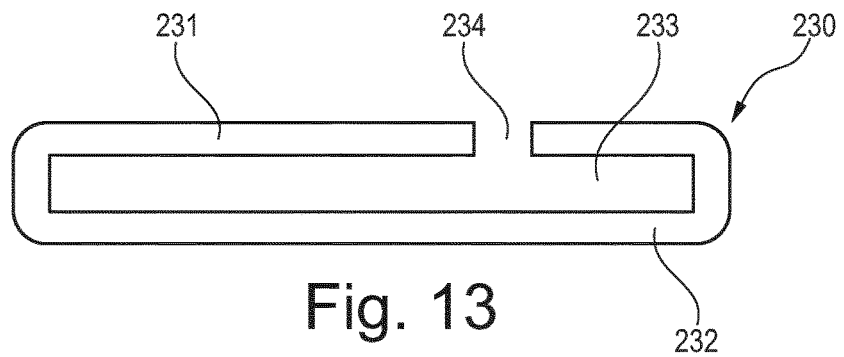
Figure 14:
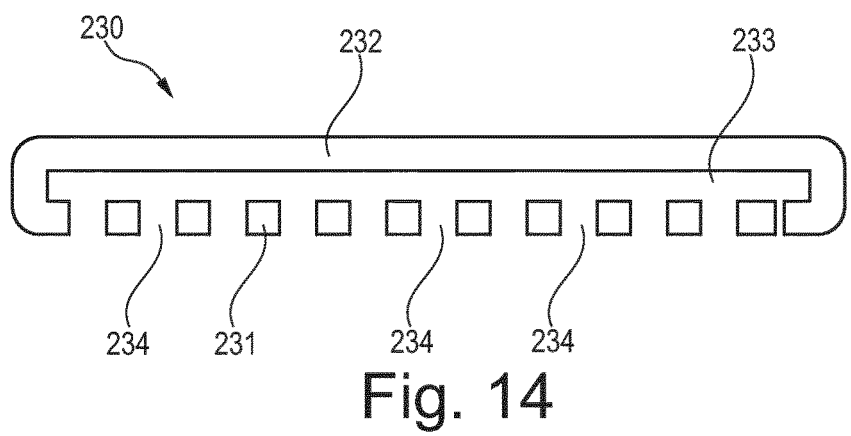
Figure 15:
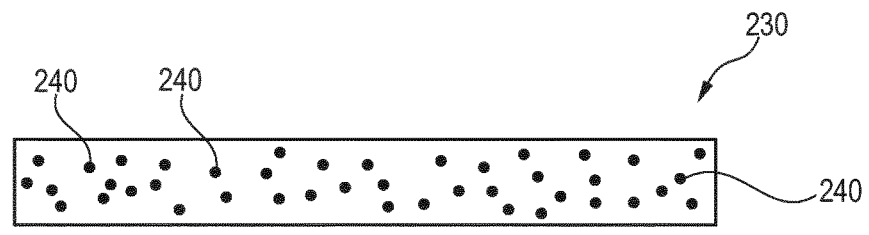

The invention may be better understood on reading the following description of nonlimiting implementation examples thereof, and on examining the attached drawing, in which:

FIG. 1 illustrates various steps of the process according to the invention,

FIG. 2 represents the steps of another process example according to the invention, FIG. 3 schematically illustrates the use of the process of FIG. 2 for the manufacture of a false nail, FIG. 4 schematically illustrates in top view a false nail obtained with the aid of a process example according to the invention, FIG. 5 schematically represents a possible step in the process according to the invention, and FIG. 6 schematically illustrates in cross section another example of a false nail obtained with the aid of a process according to the invention, FIG. 7 illustrates various steps of a second process example according to the invention, FIG. 8 represents the steps of another second process example according to the invention, FIG. 9 illustrates various steps of a third process example according to the invention, FIG. 10 represents the steps of another third process example according to the invention, FIG. 11 represents the steps of another third process example according to the invention, FIG. 12 is a photograph of a false nail made according to the third process of the invention, shown not positioned on the nail, FIGS. 13 to 15 are schematic views in cross section of examples of variants of preforms forming a reservoir that may be used for performing the third process according to the invention, FIG. 16 illustrates various steps of the fourth process according to the invention, FIG. 17 represents the steps of another fourth process example according to the invention, FIG. 18 is a schematic top view of the two shells of the mold when not assembled, FIG. 19 is a schematic top view of a false nail made using the fourth process according to the invention, before finishing, FIG. 20 is a view similar to FIG. 4, after finishing, FIG. 21 is a schematic view in cross section of the false nail of FIG. 20, and FIG. 22 is a schematic view in cross section of another example of a false nail obtained with the aid of the fourth process according to the invention.

FIG. 1 shows various steps of an example of performing a process for manufacturing a false nail according to the invention.

In a step 1, a mold is made. To do this, 3D digital data originating from the acquisition of a relief, especially that of the finger intended to receive the false nail, are taken as the basis, and the mold is manufactured from a first material.

In a step 2, a layer formed from at least one adhesive composition is deposited on the mold.

Finally, in a step 3, at least one layer of a coating of a second material, different from the first, is deposited on the mold so as to form the false nail.

In FIG. 2, besides steps 1, 2 and 3, the process comprises a preliminary step 0 which consists in scanning in three dimensions (3D) the end of the finger, extracting the nail part therefrom and creating a file on this basis for designing the mold corresponding to the relief of the scanned nail. It is on this basis that step 1 allows the production of the mold, by 3D printing of the object thus designed.

The process of FIG. 2 also comprises step 4, which consists, once the false nail has been manufactured with the adhesive composition and the coating, in extracting the false nail from the mold. To do this, the mold may be chemically or physically degraded. This degradation may consist, for example, in hollowing out the mold, for example using a high-pressure water jet cleaner.

Various steps of the process of FIG. 2 are illustrated in FIG. 3. The relief of the end of the finger D bearing the nail O is scanned in step 0 using a scanner 10. A mold 20 is then manufactured in step 1, by 3D printing in this example, from a wax forming the first material. The mold 20, viewed from above and then in profile, comprises a domed zone 21 corresponding to the relief and the contour of the false nail to be manufactured, based on the relief and the contour of the nail O. In the example illustrated, the false nail is intended to be longer than the nail and to extend beyond it, once in place on the nail O. The design of the mold integrates this extension.

In step 2, a layer 22 formed from an adhesive composition is deposited, in this example using a brush as illustrated. Next, step 3 comprises the deposition, also using a brush in this example, of a layer of a coating 23 made of a second material. Step 4 illustrates the physical degradation of the mold, in this example by placing it in an oven at a suitable temperature to melt the wax without impairing the false nail 25 obtained. The false nail 25 is removed, and is ready to be attached to the nail O.

FIG. 4 shows a top view of the false nail 25. In this example, the layer 22 of adhesive composition shown, delimited by dashed lines in this figure, covers only the periphery of the nail O onto which the false nail will be fixed. This makes it possible to have good sealing and good fixing, but also makes it possible to reduce the zone of nail O covered with the adhesive. It should be noted that there is no adhesive on the part 24 of the false nail extending from the nail.

FIG. 5 illustrates the implementation of a step in which, after deposition of the coating layer 23, it is exposed to UV radiation, so as to allow photo-crosslinking and curing of the coating.

In FIG. 3, the false nail obtained has a substantially constant thickness over its entire surface.

The example illustrated in FIG. 6 shows, in cross section, a false nail 25 having a variable thickness, the false nail 25 having patterns 26 in overthickness as visible. The patterns 26 are formed in the coating layer 23. In particular in this case, the manufacture of the coating may be performed by 3D printing on the mold, especially on the layer 22 of adhesive composition.

Needless to say, the invention is not limited to the examples that have just been described. In particular, the degradation of the mold, when this takes place, may be performed chemically.

The layer 22 formed from an adhesive composition may require the prior application to the nail and/or to the layer 22 of another composition to allow adhesion to the nail O.

The pattern of the layer 22 may vary without departing from the scope of the invention.

All or part of the process may be performed by a machine forming a 3D scanner and 3D printing, making it possible to acquire the relief of the end of the finger, to design the mold, to produce it by 3D printing, to deposit the layer 22 of adhesive composition, and to deposit the coating layer 23 onto the layer 22, for example by 3D printing.

A mold 20 may be made for more than one false nail 25, for example for the five false nails that will cover all the nails of a hand. In this case, the mold 20 comprises several domed zones 21 for each of the nails. All the domed zones will then be covered, in steps 2 and 3.

A cutting-out step may be performed after manufacture of the false nail on the mold or outside the mold. The cutting-out may be performed manually or with the aid of a machine, especially automatically, so as to make the contour of the false nail sharp or in a particular desired form.

FIG. 7 shows a first implementation example of the invention according to the second manufacturing process. In this example, the process comprises a step 100 of producing a preform by cutting-out from a coating material comprising at least one partially crosslinked compound. To do this, the developed surface of the nail is first acquired, and it is optionally extended so as to obtain the contour of the preform. This acquisition step may take place via acquisition means and data processing means or may be obtained manually with the aid, for example, of a molding paste that is deposited onto the nail part of a user.

Once the contour of the preform has been determined, it can be printed on a sheet of the coating material and the preform can then be cut out, manually or using a tool, for example a laser or a punch, by following this contour. As a variant, the contour is printed on a support such as a sheet of paper which then serves as a template for cutting out the preform by being superposed with a sheet of the partially crosslinked coating material.

In a step 102, the preform thus produced is then positioned on the nail so as to make it match the shape of the nail.

The crosslinking is then finalized, in a step 103, by exposing the preform to UV radiation. A false nail in accordance with the invention is then obtained.

In the example illustrated in FIG. 8, a step 104 starts the process, consisting in 3D scanning of the end of a user's finger. The nail part is isolated from the scan, and 2D or 3D digital data of the nail are generated and then, by calculation using these 2D or 3D digital data, the developed surface of the nail is determined. The contour of the preform is deduced therefrom, corresponding, for example, to the measured developed surface extended by calculation by 5 mm at the nail end.

In a step 105, the preform is produced by 2D printing according to the contour determined in the preceding step, from a coating material comprising at least one partially crosslinked compound, on a support consisting, for example, of a flexible plastic sheet. It is possible, for example, to print a first layer of coating material comprising a compound crosslinked at 50% of the nominal UV power, and then a second layer on the first layer, comprising a compound crosslinked at 20% of the nominal UV power.

A layer of a UV gel is deposited on the nail, in a step 106. This gel will form an adhesion layer between the nail and the part. Since the part is not 100% crosslinked, bonds will be created between the layer of UV gel and the part during the crosslinking. This will aid the adhesion. Next, the preform is positioned on the nail after having detached it from its support, in a step 107, so that the preform matches the relief of the nail.

Finally, the last step 108 consists in finalizing the crosslinking by exposing the preform to UV radiation.

A false nail solidly attached to the nail is obtained.

FIG. 9 shows steps for performing a first example of the third process according to the invention.

In this example, a preform forming a reservoir, made from a porous material, is first produced in a step 200.

To do this, the developed surface of the nail is acquired, and it is optionally extended so as to obtain the contour desired for the preform.

This acquisition step may take place via acquisition means and data processing means or may be performed manually with the aid, for example, of a molding paste that is deposited onto the nail part of a user, and which is then scanned to generate a 2D data file for the nail, which is used to generate the contour of the preform to be made.

Once the contour of the preform has been determined, the preform can be cut out, manually or using a tool, for example a laser or a punch. The material that is cut out may be the porous material itself or a support which serves as a cutting-out template for producing the preform.

In a step 202, according to this example, a solidifiable composition comprising a crosslinkable reactive compound is deposited on the preform. The deposition may take place using a brush, a sponge or any other manual or non-manual means, for example by printing using a printer.

A first exposure of the preform to UV radiation is then performed, in a step 203, so as to obtain partial crosslinking of the crosslinkable compound of the solidifiable composition.

The process is continued by depositing on the nail the same solidifiable composition in a step 204, and the preform is then positioned on the nail in a step 205. The following step may consist in pressing the preform so as to maintain it on the nail and to conform it to the surface of the nail. Solidification of the solidifiable composition is then performed, in a step 206, via finalization of the crosslinking of the partially crosslinked compound, by performing a second exposure to UV radiation of the preform and nail assembly.

In a second example illustrated in FIG. 10 of performing the third process, step 200 is performed. Next, the preform is not impregnated, but a solidifiable composition comprising a crosslinkable compound is deposited on the nail, in a step 207, for example using a brush.

Step 205 of positioning the preform on the nail, and optionally pressing it, is then performed, so as to make it match the surface of the nail.

In a subsequent step 209, partial crosslinking is performed by exposing the crosslinkable compound to UV radiation, and the solidifiable composition is then deposited on the preform, in a step 210, for example using a brush, and solidification of the solidifiable composition via finalization of the crosslinking is performed, in a step 206, by a second exposure to UV radiation.

In a third example of implementing the invention, the third process, as illustrated in FIG. 11, comprises the following steps.

After step 200 of producing the preform from a porous material, a first solidifiable composition comprising a first non-crosslinkable reactive compound is deposited thereon, in a step 220. A second solidifiable composition comprising a second non-crosslinkable reactive compound is deposited, in a step 221, this time on the nail. The first reactive compound is advantageously capable of reacting with the second non-crosslinkable reactive compound to achieve solidification of the composition chemically.

Step 205 of positioning the preform on the nail and pressing it is then performed, so as to make it match the surface of the nail. In a step 222, the second solidifiable composition is deposited on the preform, and solidification of the solidifiable compositions is performed in a step 223. This last step may involve curing by chemical reaction between the first and second reactive compounds.

It is still possible subsequently to deposit on the false nail securely attached to the nail, manually or by using a machine, for example an additive manufacturing machine, at least one layer of a coating material, such as a varnish or the like, with patterns, one or more colors, a relief or a smooth surface or any other appearance.

FIGS. 13 to 15 show three examples of variants of preforms forming a reservoir.

In FIG. 13, the preform 230 is made so as to form a macroscopic cavity 233 framed with two walls 231 and 232, the cavity 233 being able to receive and house the solidifiable composition. The cavity 233 opens to the exterior via an orifice 234, formed through the wall 231.

In the example of FIG. 14, the preform 230 is made so as to comprise the cavity 233, but this cavity opens to the exterior via a larger number of orifices 234 passing through the wall 231. The wall 231 is intended to come into contact with the nail to make it possible, during the solidification of the composition, also to achieve adhesion between the nail and the preform 230.

In the example of FIG. 15, the preform 230 forming a reservoir is made of a porous material comprising, in this example, fibers 240, capable of retaining the solidifiable composition therein. It should be noted that it would not constitute a departure from the scope of the invention if the preform forming a reservoir were to be made of an alveolar porous material.

FIG. 16 shows various steps of an example of performing the fourth process for manufacturing a false nail according to the invention.

In a step 301, a mold as two shells is made. To do this, 3D digital data originating from the acquisition of a relief, especially that of the finger intended to receive the false nail, are taken as the basis, and the two shells of the mold are manufactured, especially by 3D printing. One of the shells has a convex face toward the interior of the mold to reproduce the curvature of the nail.

In a step 302, at least one layer formed from at least one adhesive composition is deposited on this convex face of one of the shells. Next, in a step 303, after closing the mold, a coating material is injected into the mold cavity, between the shells.

Finally, in a step 304, the false nail thus formed is extracted from the mold.

In FIG. 17, besides steps 301, 302, 303 and 304, the process comprises a preliminary step 300 which consists in scanning in three dimensions (3D) the end of the finger, extracting the nail part therefrom and creating a file on this basis for designing the shells of the mold forming a cavity adapted to the relief of the scanned nail. It is on this basis that step 301 allows the production of the two shells of the mold, by 3D printing.

After deposition in step 302, especially by brush, of at least one layer formed from at least one adhesive composition, the two shells of the mold are assembled together in step 302b is to form the mold cavity. This cavity receives the coating material injected in step 303.

Extraction of the false nail from the mold may take place, especially after cooling, either by opening the mold by disassembling the shells, or by physical and/or chemical degradation of at least one of the shells.

The shells 310 and 311 of the mold are represented schematically in FIG. 18. The shell 310 has a hollow, concave relief 312, having the shape of the exterior face of the false nail that will be obtained. The shell 311 has a protruding, convex relief 313, forming the convex face 314 intended to receive the adhesive composition. The shells 310 and 311 also comprise, to allow their assembly, assembly reliefs 315 and 316, the assembly reliefs 315 being formed, for example, protruding in a complementary manner to the assembly reliefs 316, which, themselves, are formed as hollows. Finally, one of the shells comprises an injection orifice 317, through which the coating material is injected.

FIG. 19 shows the false nail 320 obtained with the aid of the process whose steps are illustrated in FIG. 2, after extraction from the mold. The false nail 320 comprises parts 321 associated with the injection, which are not yet removed. It is moreover possible for its contour to not as yet be definitive. This is why the process according to the invention may comprise a step of deflashing or trimming of these parts 321, which is a finishing step to give the false nail 320 its definitive form, illustrated in FIG. 20.

FIG. 21 is a view in cross section of the false nail 320 of FIG. 20, illustrating the layer 325 of adhesive composition and the layer 326 of coating material. After optional finishing, the false nail 320, already equipped with adhesive, is ready to be positioned on the nail, by placing the nail in contact with the layer 325 of adhesive composition. The layer 326 of coating material is the appearance layer of the false nail 320.

In the example of FIG. 21, the false nail 320 has a substantially constant thickness over its entire surface.

In the example illustrated in FIG. 22, the false nail 320 has patterns 327 in overthickness. These patterns 327 are formed in the coating layer 326, the shell 310 then being advantageously intended to create such patterns 327.

EXAMPLES

Example 1

The end of a person's finger is taken by a 3D scanner. By file data processing, the nail part of the end of the finger is isolated and a 3D file of the surface of the nail is produced. From this 3D file comprising the 3D digital data of the acquisition of the relief of the nail, a "mold" 3D digital object is created.

The 3D digital data of this "mold" 3D digital object are then used to produce, via a 3D printer, for example the printer sold under the brand name ProJet® 3500 HDMax by the company 3D Systems, a mold made of a first material formed in this example from wax, especially the wax sold under the brand name VisiJet® S300 by the company 3D Systems.

The adhesive composition is then made with the following mass proportions, relative to the total mass of the composition:

Kraton G1701 5%,
Regalite R1100CG 15%
Kaydol 5%
Isoamyl acetate in quantity sufficient for 100%.

A layer of this composition is deposited by brush, on the mold, in a mass amount of about 2.5 mg.

Next, after drying by evaporation, a layer of a second material consisting of a photo-crosslinkable resin, known under the brand name VisiJet® M3 Crystal sold by the company 3D Systems, is deposited by brush so as to cover the whole with a layer 400 µm thick. The assembly is then illuminated with a UV lamp for 3 minutes. The UV lamp may be the one known under the trade name CND Shellac 36 W.

At the end of the treatment, the wax forming the mold is removed by heating in an oven at 65° C. for 4 hours and the false nail thus manufactured is extracted. The false nail is ready to be attached to the nail.

Example 2

A support is made by 3D printing reproducing five nail molds made of a first material.

This support is then scanned in 2D and the projected surfaces of the nail parts are extracted, omitting all the surfaces between the nail parts.

This file is introduced into a printing machine, for example a printer from the company Scodix. Before introducing the mold into the machine, it is spread, using a brush, with a layer of about 100 µm of an adhesive composition having the following formula:

Kraton G1701 5%,
Regalite R1100CG 15%
Kaydol 5%
Isoamyl acetate qs 100%

The mold thus covered is then placed in the Scodix printer. The Scodix printer is set up, by means of its positioning system. Thus, on the basis of the 2D file, it delivers the photo-polymerizable ink sold under the name PolySENSE® 100 by the company Scodix onto the nail parts of the support.

The machine is controlled so that it prints, with the photo-polymerizable ink forming the second material, the nail surfaces over a thickness of about 250 µm.

After printing, the whole is subjected to UV irradiation, solidifying the photo-polymerizable ink. Five false nails are obtained. The false nails may be separated from their support.

Example 3

A 3D object is made by additive manufacture, using the Visijet S400 equipment sold by the company 3D Systems. The object is a mold and represents a nail.

A layer of 1 mm of water-based adhesive, known under the brand name Uhu®, is then deposited onto the surface of the mold.

A coating 500 μm thick is then produced on this coated surface by applying a UV gel known under the brand name CND Shellac Xpress 5 top coat. The whole is placed under a UV lamp for 3 times 1 minute with an interval of one minute between each irradiation. The lamp is known under the brand name CND Shellac 36 W.

The false nail thus obtained is detached from the mold.

Example 4: Implementation of the Second Manufacturing Process According to the Invention A Scodix brand Series S, S52 Press machine capable of irradiating at 260 and 368 nm is used.

A person's finger is scanned, using acquisition means such as a 3D scanner. The nail part is isolated and its developed surface is determined by creating a 2D file. The 2D file is manipulated so as to extend it by 5 mm in the continuation of the nail.

The Scodix brand printer is then used to deposit a layer of about 100 μm of coating material onto a plastic sheet, the deposited layer having the contour given by the 2D file.

The coating material may have the following composition:

| Coating material | Weight % |
| --- | --- |
| Adhesive: Methacryloyloxyethyl maleate (HEMA Maleate sold by the company Esstech Inc.) | 7.5 |
| Crosslinkable compound: Isophorone Urethane Dimethacrylate (X-851-1066 sold by the company Esstech Inc.) | 10.5 |
| PEG-400 Urethane dimethacrylate (X-726-0000 sold by the company Esstech Inc.) | 30 |
| Tetrahydrofurfuryl methacrylate (X-958-7446 sold by the company Esstech Inc.) | 7 |
| Resin: Methyl methacrylate (MMA)/butyl methacrylate (BMA) copolymer (Paraloid B 66 100% sold by the company Dow Chemical) | 6.33 |
| Solvent: Nitrocellulose containing 30% isopropyl alcohol (viscosity = E22-½s) (Idyl E35 TX IPA 30% sold by the company Bergerac-SNPE) | 6.67 |
| ethyl acetate | 22 |
| butyl acetate | 6 |
| Photoinitiator ethyl (2,4,6-trimethylbenzoyl) phenylphosphinate (Lucirin TPO-L sold by the company BASF) | 4 |

As a variant, the reference photo-crosslinkable ink Polysense 100 from the company Scodix is used as coating material.

This first layer of coating material is crosslinked at 50% of the nominal UV power. Next, a second layer (100 μm) of the same composition is printed on the same sheet and on the same contour, care being taken to crosslink it at only 20% of the nominal UV power.

The preform thus formed is then detached, placed on a nail treated beforehand with a UV gel sold under the name Shellac® by the company CND, which acts as adhesive, and is then illuminated with a UV lamp so as to finalize the crosslinking.

A false nail which perfectly matches the shape of the nail, which is comfortable to wear and which is longer-lasting than a varnish is obtained.

Example 5: Implementation of the Second Manufacturing Process According to the Invention The same test as in Example 4 is performed, except that the preform is not detached from its support before application. The support is used as applicator, by bringing the upper face of the preform facing the nail. The preform is then crosslinked by irradiating it through the support. It is not removed until after step 2).

Example 6: Implementation of the Second Manufacturing Process According to the Invention The same test as in Example 5 is performed, except that the second layer is crosslinked at 10% of the nominal UV power. This makes it possible to "gel" the layer slightly. Thus, when the part is applied, it does not expel the second layer.

Example 7: Implementation of the Second Manufacturing Process According to the Invention The same test as in Example 6 is performed, with the exception that the second layer is not crosslinked. This makes it possible to save time, if it is desired to go faster.

Example 8: Implementation of the Third Manufacturing Process According to the Invention A silicone paste composition for imprints is applied to the nail, which is made by mixing the two components of the resin Silfo sold by the company Monaderm. The composition is carefully adjusted to the contours of the nail. It is left to set to a solid on the nail for 5 minutes. The paste part molded in the shape of the nail is then detached. It is then pressed between two glass slides. A photograph in top view of the pressed part is then taken. A 2D digital file of the developed surface of the nail is thus created, constituting 2D digital data for the nail, and processing of these data is then performed to obtain the desired contour of the preform, including an extension of the nail by a length of 5 mm.

The contour of the preform is printed on a sheet of paper and the printed contour is cut out. The template obtained is used for cutting out a preform of the same size from a porous material formed from a sheet of cellulose.

On the preform is placed a solidifiable composition comprising a crosslinkable reactive compound having the following formula:

| Solidifiable composition | Weight % |
| --- | --- |
| Adhesive: Methacryloyloxyethyl maleate (HEMA Maleate sold by the company Esstech Inc.) | 7.5 |
| Crosslinkable reactive compound: Isophorone Urethane Dimethacrylate (X-851-1066 sold by the company Esstech Inc.) | 10.5 |
| PEG-400 Urethane dimethacrylate (X-726-0000 sold by the company Esstech Inc.) | 30 |
| Tetrahydrofurfuryl methacrylate (X-958-7446 sold by the company Esstech Inc.) | 7 |

-continued

| Solidifiable composition | Weight % |
|---|---|
| Resin: Methyl methacrylate (MMA)/butyl methacrylate (BMA) copolymer (Paraloid B 66 100% sold by the company Dow Chemical) | 6.33 |
| Solvent: Nitrocellulose containing 30% isopropyl alcohol (viscosity = E22-⅕s) (Idyl E35 TX IPA 30% sold by the company Bergerac-SNPE) | 6.67 |
| ethyl acetate | 22 |
| butyl acetate | 6 |
| Photoinitiator ethyl (2,4,6-trimethylbenzoyl) phenylphosphinate (Lucirin TPO-L sold by the company BASF) | 4 |

The preform is impregnated with this solidifiable composition. A first exposure to UV radiation is performed for 15 seconds.

The same solidifiable composition is deposited on the nail, for example using a brush.

The preform impregnated with the solidifiable composition is then placed with the partially crosslinked reactive compound on the nail. The preform is pressed on the nail. A second exposure to UV radiation is performed for 3 minutes. The false nail 211 illustrated in FIG. 12, but positioned on the nail, is obtained.

Example 9: Implementation of the Third Manufacturing Process According to the Invention The preform is produced as in Example 8, without, however, impregnating it with the solidifiable composition. The solidifiable composition is deposited on the nail. The non-impregnated preform is then placed on the nail. A first exposure of the whole to UV radiation is performed for 1 minute. This makes it possible to achieve a first rigidity and to partially crosslink the crosslinkable reactive compound of the solidifiable composition.

Thereafter, the whole is covered with a layer of the same solidifiable composition. A second exposure of the whole to UV radiation is performed for 3 minutes. The false nail is obtained.

Example 10: Implementation of the Third Manufacturing Process According to the Invention As in Example 8, the preform is made of a porous material made from a sheet of cellulose.

The preform is impregnated with a first solidifiable composition formed by the hardener of the Araldite® adhesive.

A formula of a second composition formed by the resin of the Araldite® adhesive is then deposited on the nail.

The impregnated preform is then placed on the nail. It is pressed on.

Finally, a layer of Araldite® adhesive is applied with hardener to the outer surface of the preform. It is left to cure and the false nail is obtained.

Example 11: Implementation of the Fourth Manufacturing Process According to the Invention The end of a person's finger is taken by a 3D scanner. By file data processing, the nail part of the end of the finger is isolated and a 3D file of the surface of the nail is produced. From this 3D file comprising the 3D digital data of the acquisition of the relief of the nail, a "convex shell" 3D digital object having the shape of the nail, extended or otherwise, is created. A "concave shell" 3D object is also created, having the shape that it is desired to give to the upper face of the false nail.

The 3D digital data of these "convex shell" and "concave shell" 3D digital objects are then used to produce, via a 3D printer, for example the printer sold under the brand name ProJet® 3500 HDMax by the company 3D Systems, a mold comprising the two shells made of a material formed in this example from a photo-crosslinkable resin sold under the brand name VisiJet® M3 Crystal by the company 3D Systems.

The adhesive composition is then made with the following mass proportions, relative to the total mass of the composition:

Kraton G1701 5%,
Regalite R1100CG 15%
Kaydol 5%
Isoamyl acetate in quantity sufficient for 100%.

A layer of this composition is deposited by brush, onto the convex shell, in a mass amount of about 2.5 mg.

After drying, the two shells are assembled together to form the mold and a coating material formed by a thermo-injectable thermoplastic polymer is injected.

After cooling, the false nail comprising the adhesive on its inner face is stripped from the mold. The false nail is then applied to the nail and pressed to fix it on.

The invention claimed is:

1. A process for manufacturing a fake nail, comprising:
   a) producing by additive manufacture, from 3D digital data originating from the acquisition of a relief of a finger intended to receive the false nail, a mold using a first material,
   b) depositing onto said mold a layer formed from at least one adhesive composition, the deposition of the adhesive composition being performed by a method selected from the group consisting of 2D printing, 3D printing, spraying, dipping and transfer, and
   c) after implementing b), depositing onto said mold at least one layer of a coating of a second material, different from the first, so as to at least partly cover the layer of adhesive composition and to form the false nail, the deposition of the coating being performed with a method selected from the group consisting of thermoforming, 2D printing, 3D printing, injection, dipping and transfer.

2. The process as claimed in claim 1, further comprising extracting the false nail from the mold by at least one of physical and chemical degradation of at least part of the mold.

3. The process as claimed in claim 2, wherein the at least one of the physical and chemical degradation is at least partly performed by heating at least part of the first material.

4. The process as claimed in claim 2, wherein the at least one of the physical and chemical degradation at least partly is a mechanical degradation consisting in hollowing out.

5. The process as claimed in claim 2, wherein the at least one of the physical and chemical degradation is at least partly a chemical degradation, consisting of selective dissolution of the first material using a solvent that is inert toward the adhesive composition and the second material.

6. The process as claimed in claim 5, wherein said solvent is chosen from alkanes, ketones, ethers, and esters.

7. The process as claimed in claim 1, wherein the depositing the coating onto the mold is performed so as to cover at least one zone of the mold not covered with the layer of adhesive composition.

8. The process as claimed in claim 1, wherein b) and c) of the process are performed such that the layer of adhesive composition has a different pattern from that formed by the coating.

9. The process as claimed in claim 8, wherein the layer of adhesive composition forms a pattern extending over all or part of the periphery of the pattern formed by the coating.

10. The process as claimed in claim 1, wherein the second material is, before deposition onto the mold, in solid form, or in liquid form dissolved partially or totally crosslinked.

11. The process as claimed in claim 1, further comprising a step of cutting-out of the false nail.

12. The process as claimed in claim 11, wherein the cutting-out of the false nail is performed manually or automatically.

13. The process as claimed in claim 1, in which the acquisition of the relief comprises scanning of the end of a user's finger, followed by isolation of a nail part of said scan resulting in the creation of 3D digital data, and the creation of a 3D object forming the mold from the 3D digital data.

14. The process as claimed in claim 1, wherein the first material is a hot-melt material.

15. The process as claimed in claim 14, wherein said hot-melt material has a melting point between 45° C. and 200° C.

16. The process as claimed in claim 15, wherein the hot-melt material is chosen from waxes, thermoplastic polymers and/or semicrystalline polymers.

17. The process as claimed in claim 1, wherein the adhesive composition comprises at least one adhesive compound and a solvent.

18. The process as claimed in claim 17, wherein the adhesive compound is chosen from pressure-sensitive adhesives, dissolved adhesives, and glues.

19. The process as claimed in claim 1, wherein the second material different from the first material is chosen from thermoplastic polymers and thermosetting polymers.

20. The process as claimed in claim 19, further comprising exposing the coating layer to the radiation of a lamp.

21. The process as claimed in claim 1, wherein the additive manufacture is 3D printing or stereolithography.

* * * * *